United States Patent
Goel et al.

(10) Patent No.: US 11,496,892 B2
(45) Date of Patent: Nov. 8, 2022

(54) SECURE INFRASTRUCTURE ONBOARDING SYSTEM

(71) Applicant: Dell Products L.P., Round Rock, TX (US)

(72) Inventors: Naman Goel, Bangalore (IN);
Shivendra Katiyar, Bangalore (IN);
Ravishankar Kanakapura Nanjundaswamy, Bangalore (IN);
John H. Terpstra, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 17/155,821

(22) Filed: Jan. 22, 2021

(65) Prior Publication Data

US 2022/0240083 A1 Jul. 28, 2022

(51) Int. Cl.
| | |
|---|---|
| *H04W 12/0431* | (2021.01) |
| *H04W 24/02* | (2009.01) |
| *H04W 12/0433* | (2021.01) |
| *H04W 12/069* | (2021.01) |

(52) U.S. Cl.
CPC ... *H04W 12/0431* (2021.01); *H04W 12/0433* (2021.01); *H04W 12/069* (2021.01); *H04W 24/02* (2013.01)

(58) Field of Classification Search
CPC ......... H04W 12/0431; H04W 12/0433; H04W 12/069; H04W 24/02
See application file for complete search history.

(56) References Cited

U.S. PATENT DOCUMENTS

| | | | | |
|---|---|---|---|---|
| 8,316,237 | B1* | 11/2012 | Felsher | H04L 9/3249 |
| | | | | 380/282 |
| 9,853,965 | B2* | 12/2017 | Yin | H04L 63/0823 |
| 9,996,999 | B2* | 6/2018 | Conrad | G07C 9/00174 |
| 10,652,219 | B2* | 5/2020 | Crabtree | H04L 63/061 |
| 10,673,617 | B1* | 6/2020 | Antoniou | G06F 13/4282 |
| 10,999,265 | B2* | 5/2021 | Ma | H04W 12/069 |
| 11,127,001 | B2* | 9/2021 | Tang | G06Q 20/3278 |
| 11,177,950 | B2* | 11/2021 | Lo | H04L 9/0866 |
| 2017/0093700 | A1* | 3/2017 | Gilley | H04L 69/08 |
| 2019/0149530 | A1* | 5/2019 | Ma | H04L 67/12 |
| | | | | 726/3 |
| 2020/0225889 | A1* | 7/2020 | Chang | H04L 12/2812 |
| 2020/0313898 | A1* | 10/2020 | Troia | H04L 9/3263 |
| 2021/0014710 | A1* | 1/2021 | Raju | H04W 4/38 |

* cited by examiner

*Primary Examiner* — Viral S Lakhia

(74) *Attorney, Agent, or Firm* — Joseph Mencher

(57) ABSTRACT

A secure infrastructure onboarding system includes an infrastructure device with an infrastructure device wireless subsystem that it may use to perform wireless key management system discovery operations in response to initialization. A key management system includes a key management system wireless subsystem it uses to perform the wireless key management system discovery operations with the infrastructure device. The key management subsystem may then wirelessly receive an infrastructure device certificate along with an infrastructure device validation key from the infrastructure device, and validate the first infrastructure device based on the first infrastructure device certificate and the first infrastructure device validation key. In response, the key management system may wirelessly transmit a first credential generation key that is configured for use by the first infrastructure device to generate first authentication credentials.

20 Claims, 25 Drawing Sheets

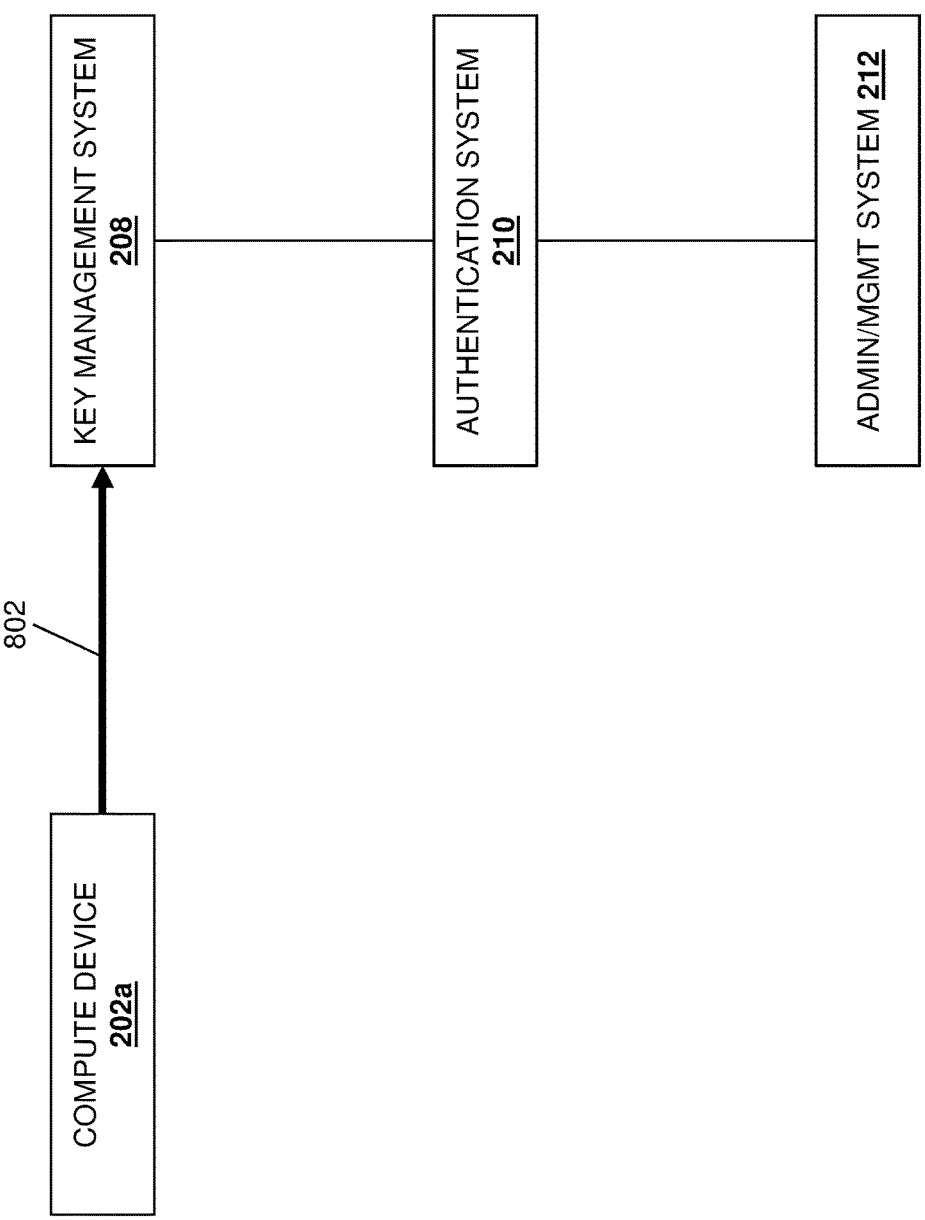

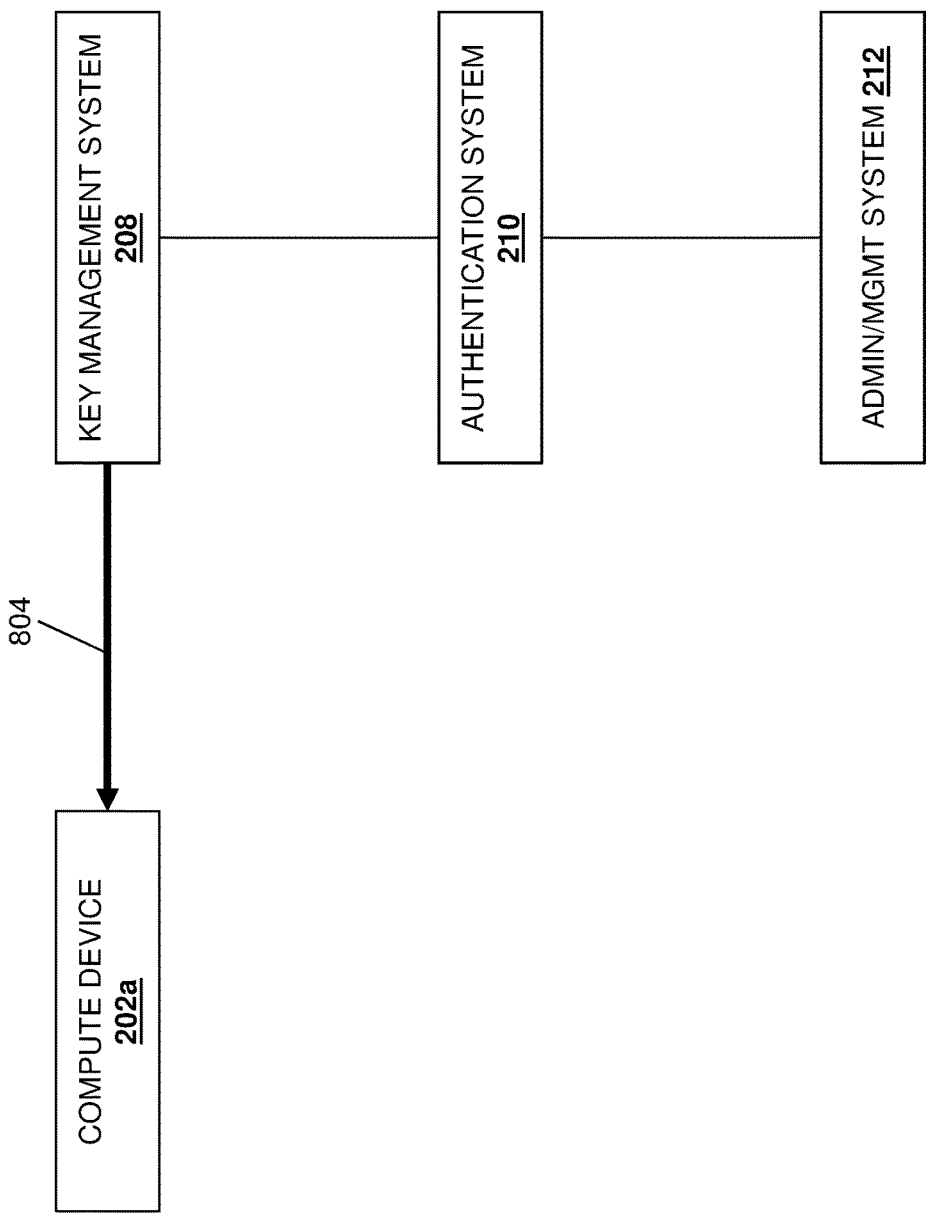

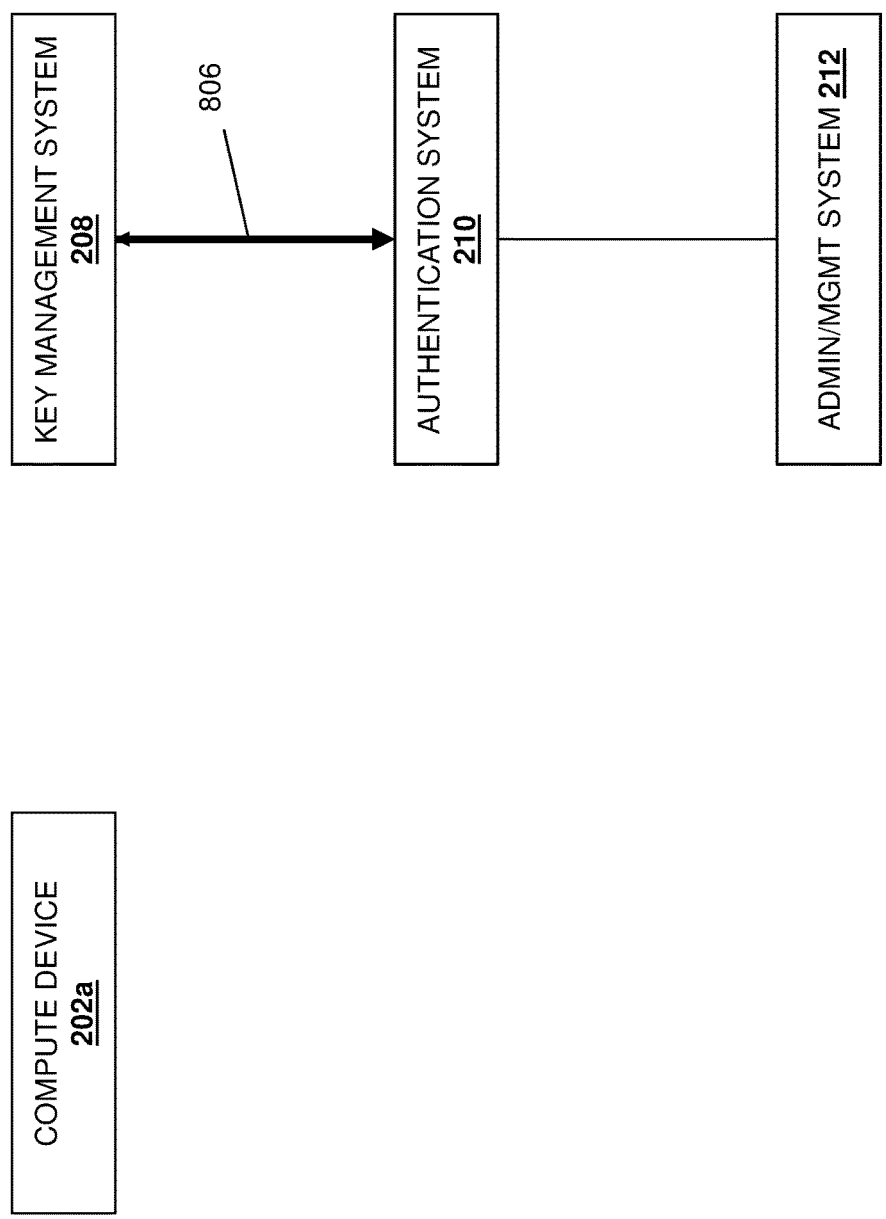

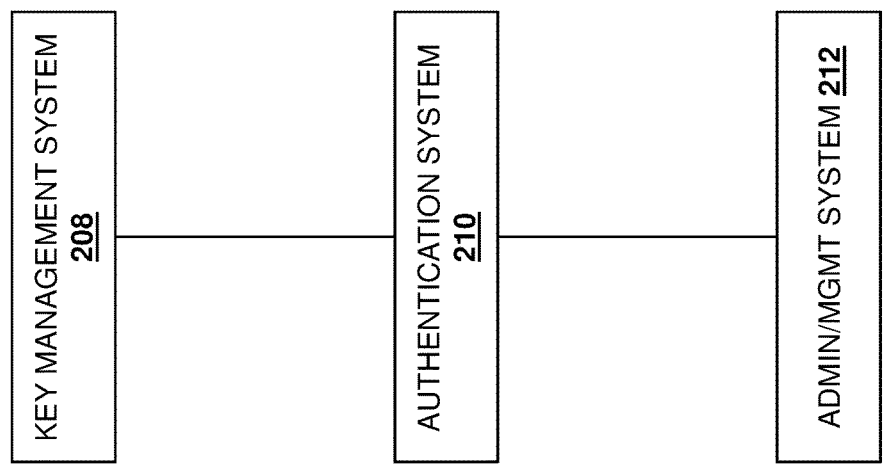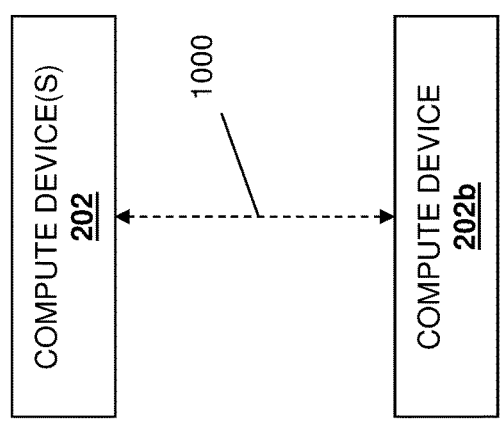
FIG. 10A

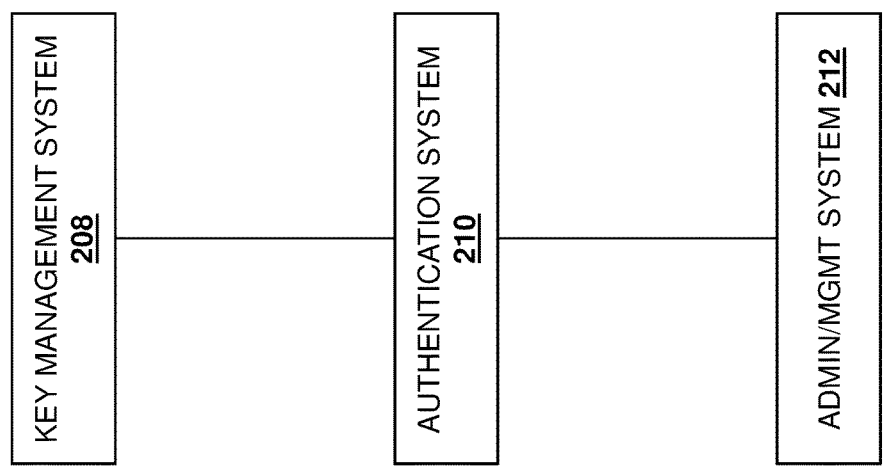
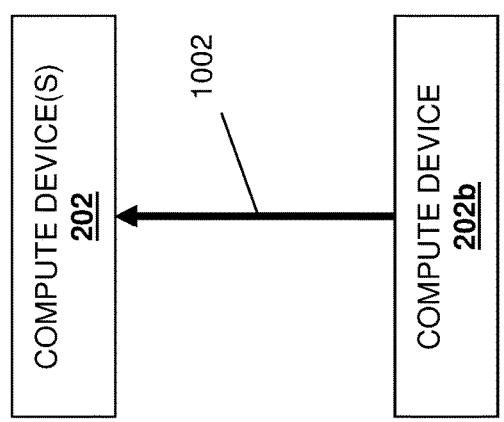
FIG. 10B

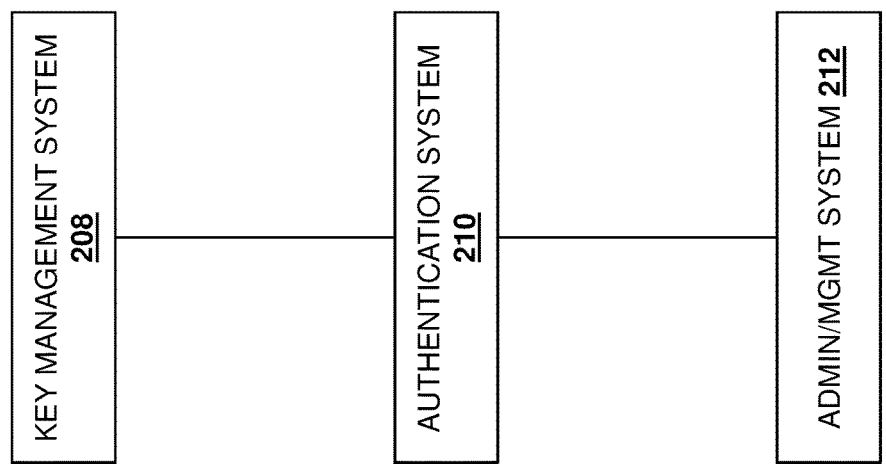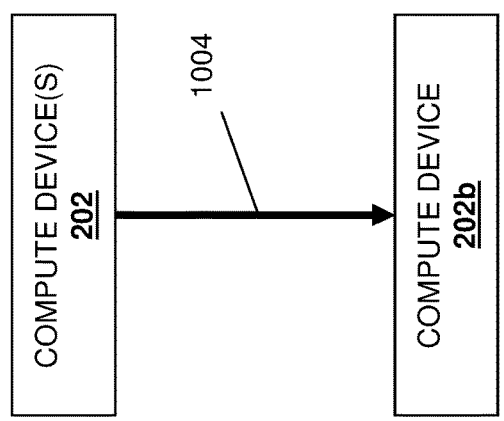

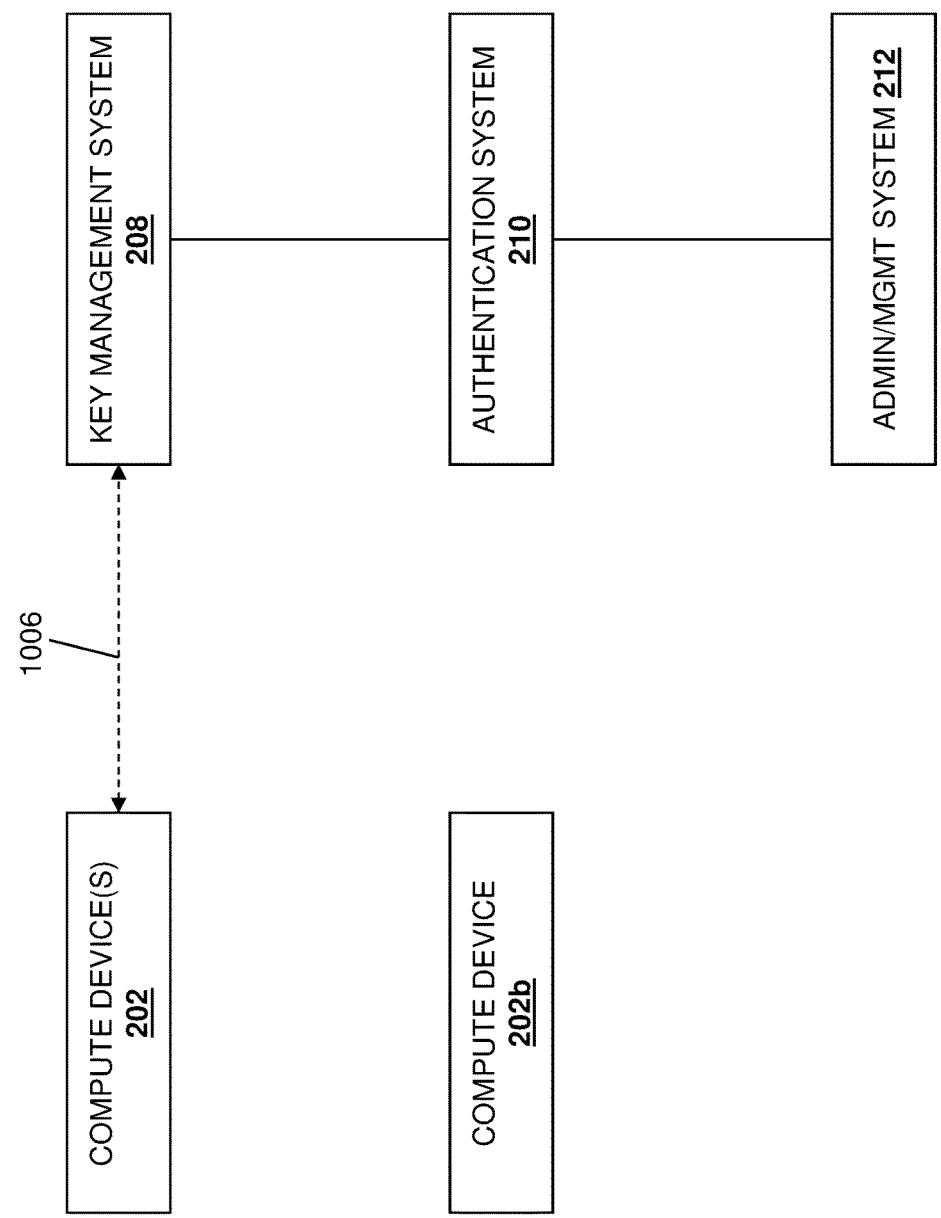

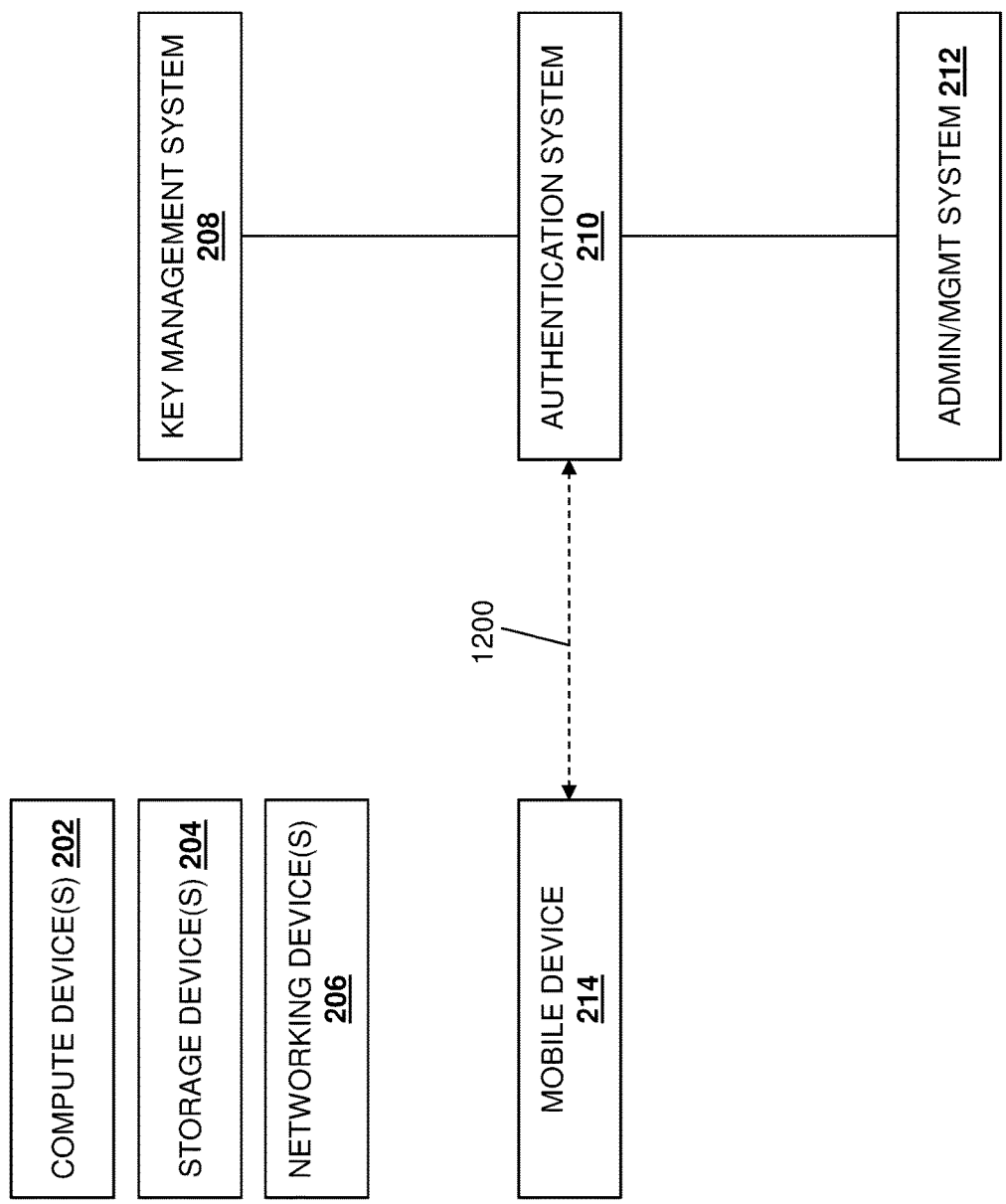

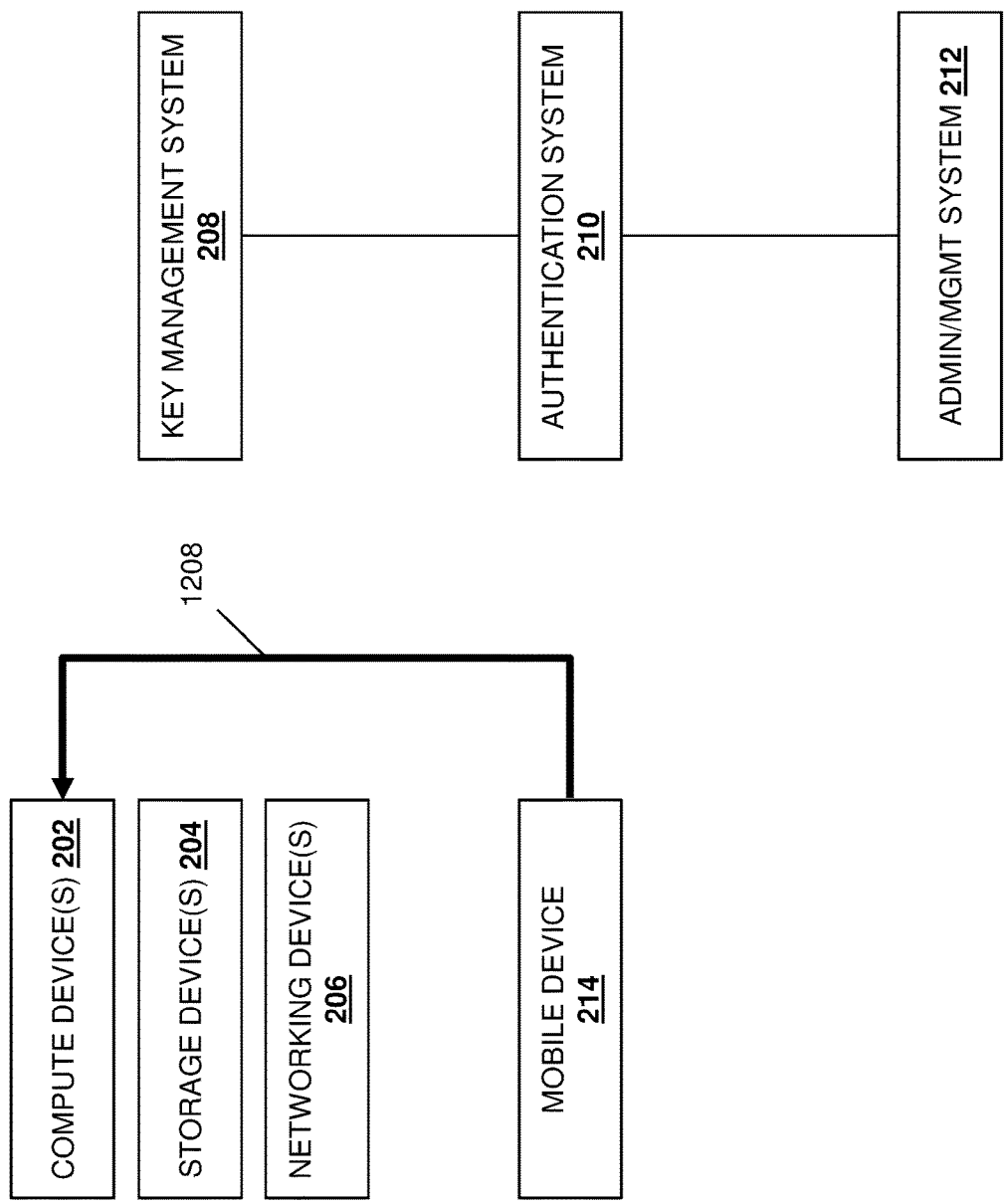

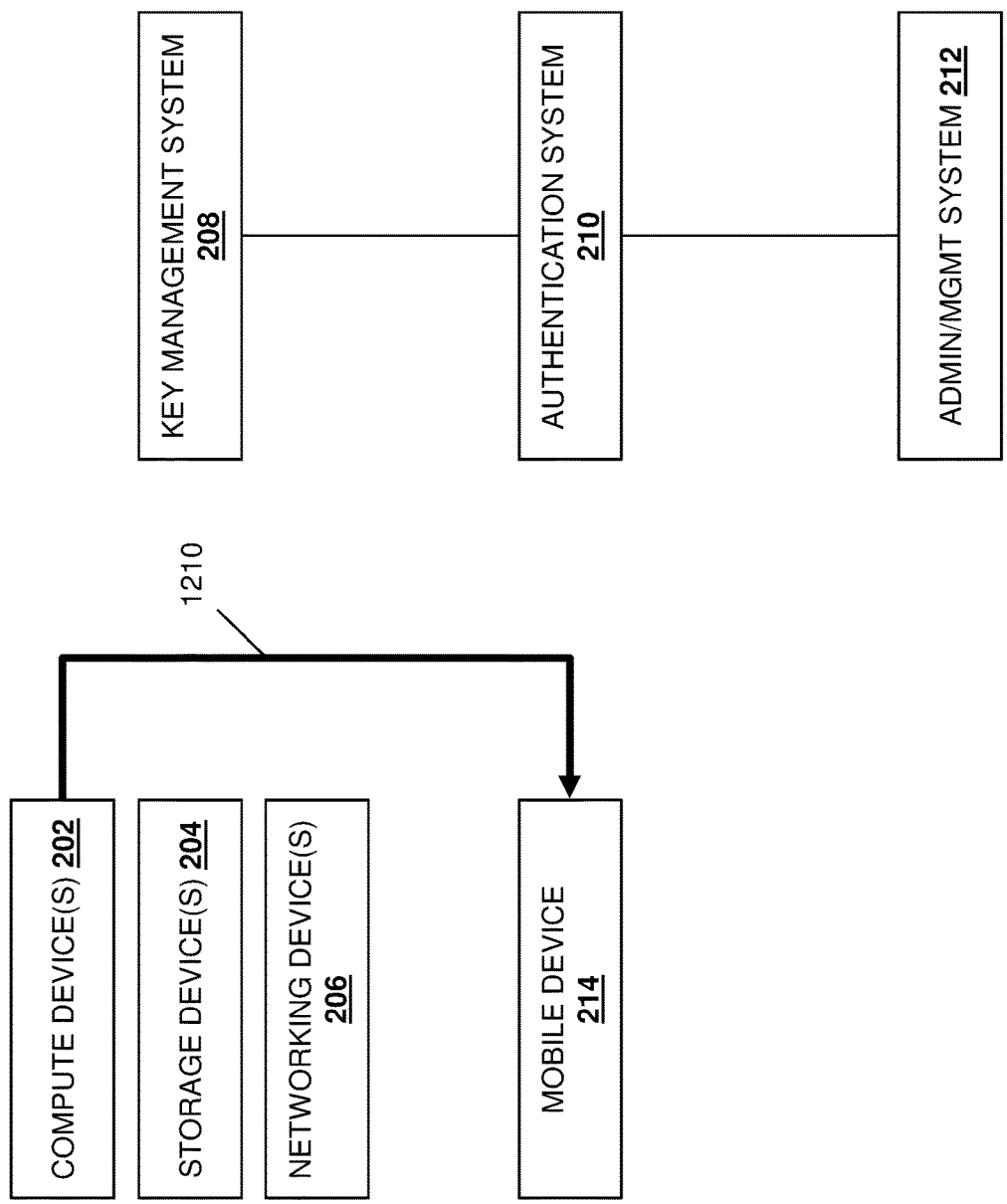

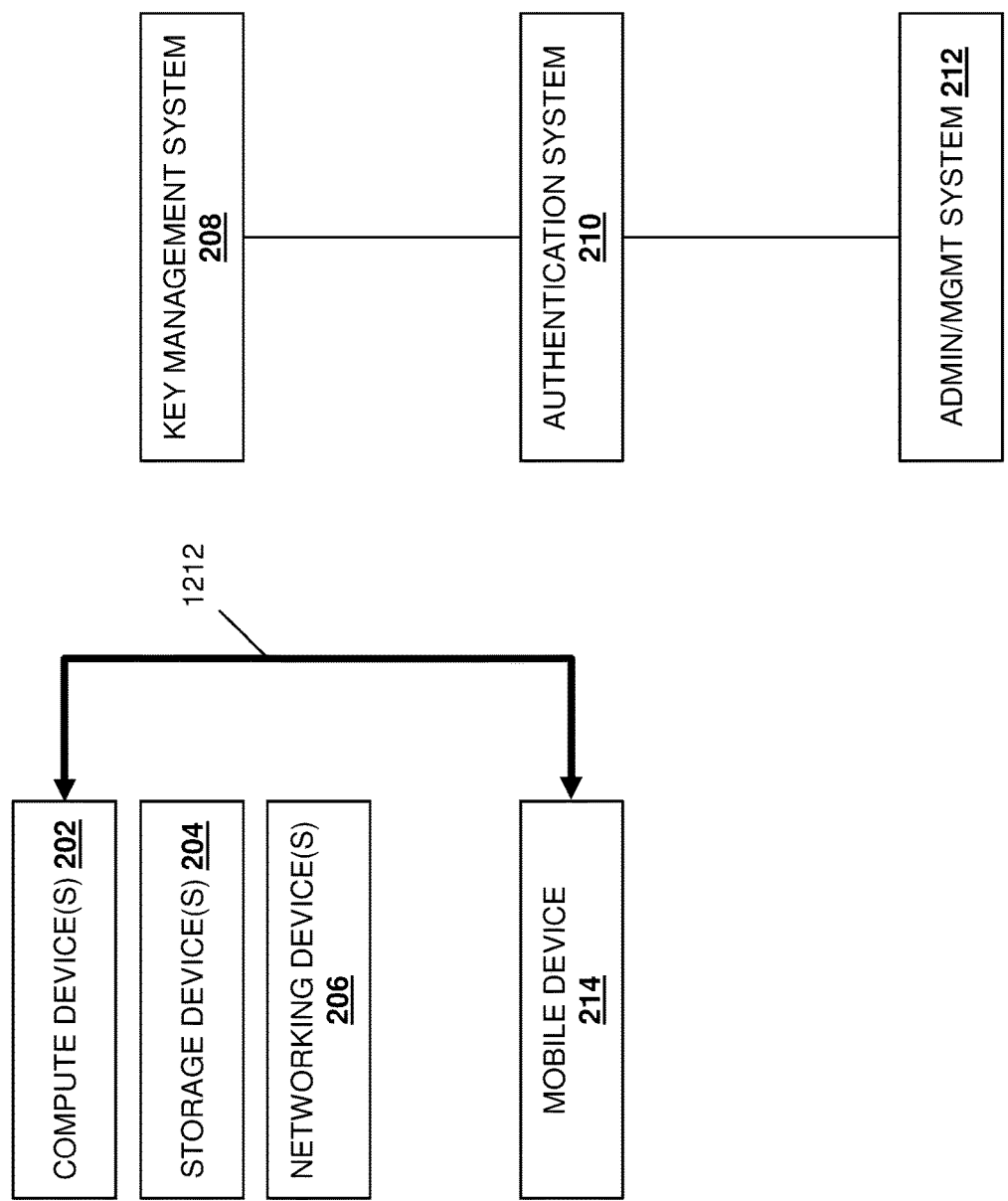

SECURE INFRASTRUCTURE ONBOARDING SYSTEM

BACKGROUND

The present disclosure relates generally to information handling systems, and more particularly to securely onboarding information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, compute/server devices, storage devices, and/or networking devices, often require "onboarding" that configures them to operate as part of a network. For example, enterprise cloud datacenters often include many compute/server devices, storage devices, and/or networking devices that must be securely onboarded to operate as part of the datacenter, which is a multi-step process that may be part of either initially setting up a datacenter with new devices, or adding new device(s) to an existing datacenter. As will be appreciated by one of skill in the art in possession of the present disclosure, setting up a datacenter with new devices requires the configuration of authentication for the devices based on enterprise security policies, which may include setting up authentication credentials, group policies, user policies, and/or other security information. For example, adding new devices to an existing datacenter requires that those devices follow the enterprise security policies while performing "handshakes" and/or other communications with existing devices. However, most devices will arrive from the factory with static, predefined initial credentials (e.g., randomly selected credentials, default credentials, etc.), and thus onboarding operations require manual credential re-provisioning process, or the use of a management application to re-provision credentials.

Authentication in a datacenter is typically managed remotely, and may utilize authentication techniques (e.g., OAuth 2.0- or OpenID Connect (OIDC)-based authentication techniques) that maintain a role for each user. However, due to default user credentials often being initially provided on devices as discussed above, it can be very difficult to maintain rights-based access for devices during onboarding operations, and continuous audit techniques must then be performed in order to ensure security is maintained. Furthermore, due to devices often being initially provided with default factory settings, onboarding operations often require the set up of network and security policies, which can present the possibility of man-in-the-middle attacks, a situation that is exacerbated when the datacenter is accessible via a public network.

Existing techniques for performing such onboarding operations tend to involve a variety of manual processes. For example, conventional credential re-provisioning techniques include manually configuring the new device with new authentication credentials (e.g., OAuth 2.0/OIDC authentication credentials) using its initial credentials, manually scanning a Quick Response (QR) code displayed on the new device to retrieve its initial credentials (or manually entering those initial credentials) using a mobile device application to enable configuration of new authentication credentials via that mobile device application, manually connecting a laptop/notebook computing device to the new device (e.g., using a Universal Serial Bus (USB) Network Interface Controller (NIC)) and using the initial credentials to setup the new authentication credentials, using the initial credentials with a remote application to access a web User Interface (UI)/console provided by the new device in order to setup the new authentication credentials, or using a using a management application to either 1) automatically discover the new device (e.g., using the Dynamic Host Configuration Protocol (DHCP), which opens up man-in-the-middle attacks) and authenticate the new device using a certificate-based handshake so that the new authentication credentials may be set up, or 2) using the initial credentials to discover and authenticate the new device in order to setup the new authentication credentials. As such, conventional infrastructure onboarding techniques are time consuming manual processes that can jeopardize the security of the datacenter within which they are being performed.

Accordingly, it would be desirable to provide an infrastructure onboarding system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a key management onboarding engine that is configured to: perform, using a key management system wireless subsystem, wireless key management system discovery operations with first infrastructure device via a first infrastructure device wireless subsystem in the first infrastructure device; wirelessly receive, from the first infrastructure device via the first infrastructure device wireless subsystem and through the key management system wireless subsystem, a first infrastructure device certificate along with a first infrastructure device validation key; validate the first infrastructure device based on the first infrastructure device certificate and the first infrastructure device validation key; and wirelessly transmit, in response to validating the first infrastructure device and through the key management system wireless subsystem to the first infrastructure device via the first infrastructure device wireless subsystem, a first credential generation key that is configured for use by the first infrastructure device to generate first authentication credentials.

BRIEF DESCRIPTION OF THE DRAWINGS

FIG. 8B is a schematic view illustrating an embodiment of a device being onboarded in the networked system of FIG. 2 during the method of FIG. 7.

FIG. 8C is a schematic view illustrating an embodiment of a device being onboarded in the networked system of FIG. 2 during the method of FIG. 7.

FIG. 8D is a schematic view illustrating an embodiment of a device being onboarded in the networked system of FIG. 2 during the method of FIG. 7.

FIG. 10A is a schematic view illustrating an embodiment of a device being onboarded in the networked system of FIG. 2 during the method of FIG. 9.

FIG. 10B is a schematic view illustrating an embodiment of a device being onboarded in the networked system of FIG. 2 during the method of FIG. 9.

FIG. 10C is a schematic view illustrating an embodiment of a device being onboarded in the networked system of FIG. 2 during the method of FIG. 9.

FIG. 10D is a schematic view illustrating an embodiment of a device being onboarded in the networked system of FIG. 2 during the method of FIG. 9.

FIG. 12A is a schematic view illustrating an embodiment of a secure infrastructure access operations in the networked system of FIG. 2 during the method of FIG. 11.

FIG. 12E is a schematic view illustrating an embodiment of a secure infrastructure access operations in the networked system of FIG. 2 during the method of FIG. 11.

FIG. 12F is a schematic view illustrating an embodiment of a secure infrastructure access operations in the networked system of FIG. 2 during the method of FIG. 11.

FIG. 12G is a schematic view illustrating an embodiment of a secure infrastructure access operations in the networked system of FIG. 2 during the method of FIG. 11.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
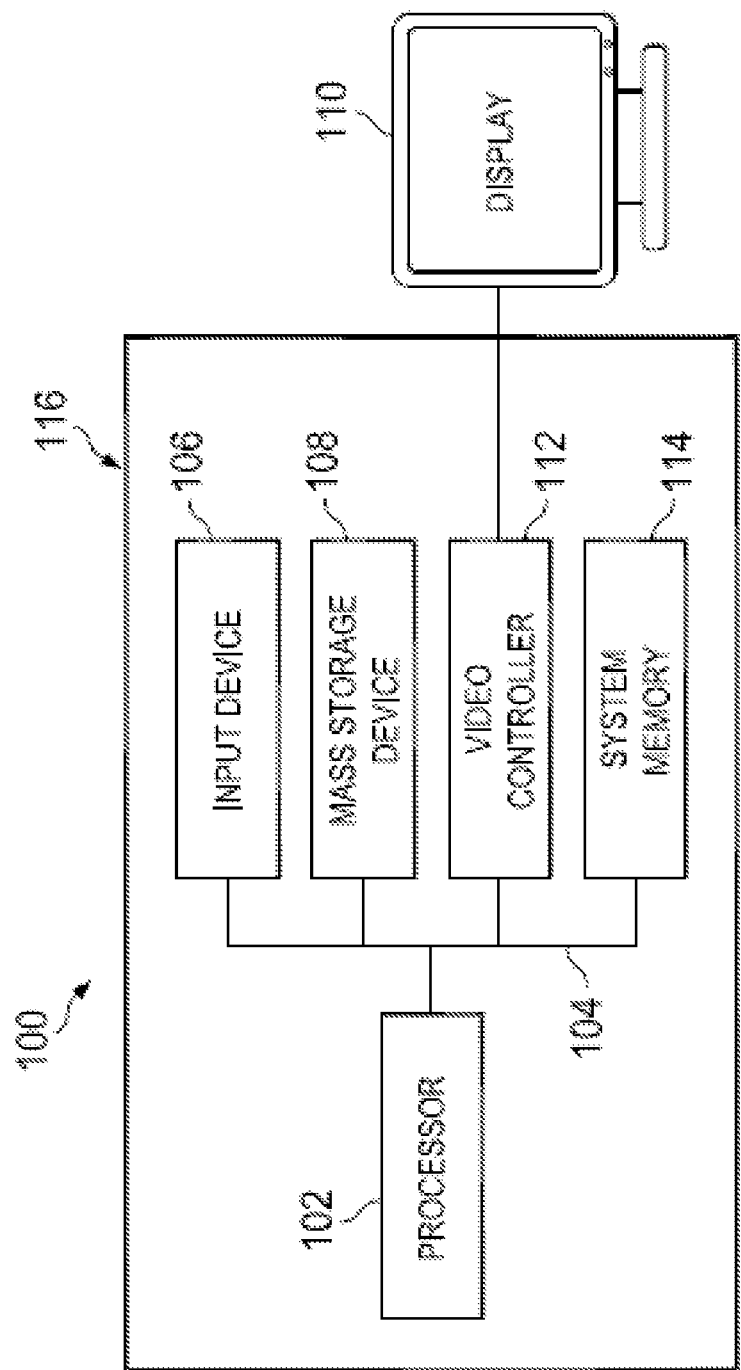
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
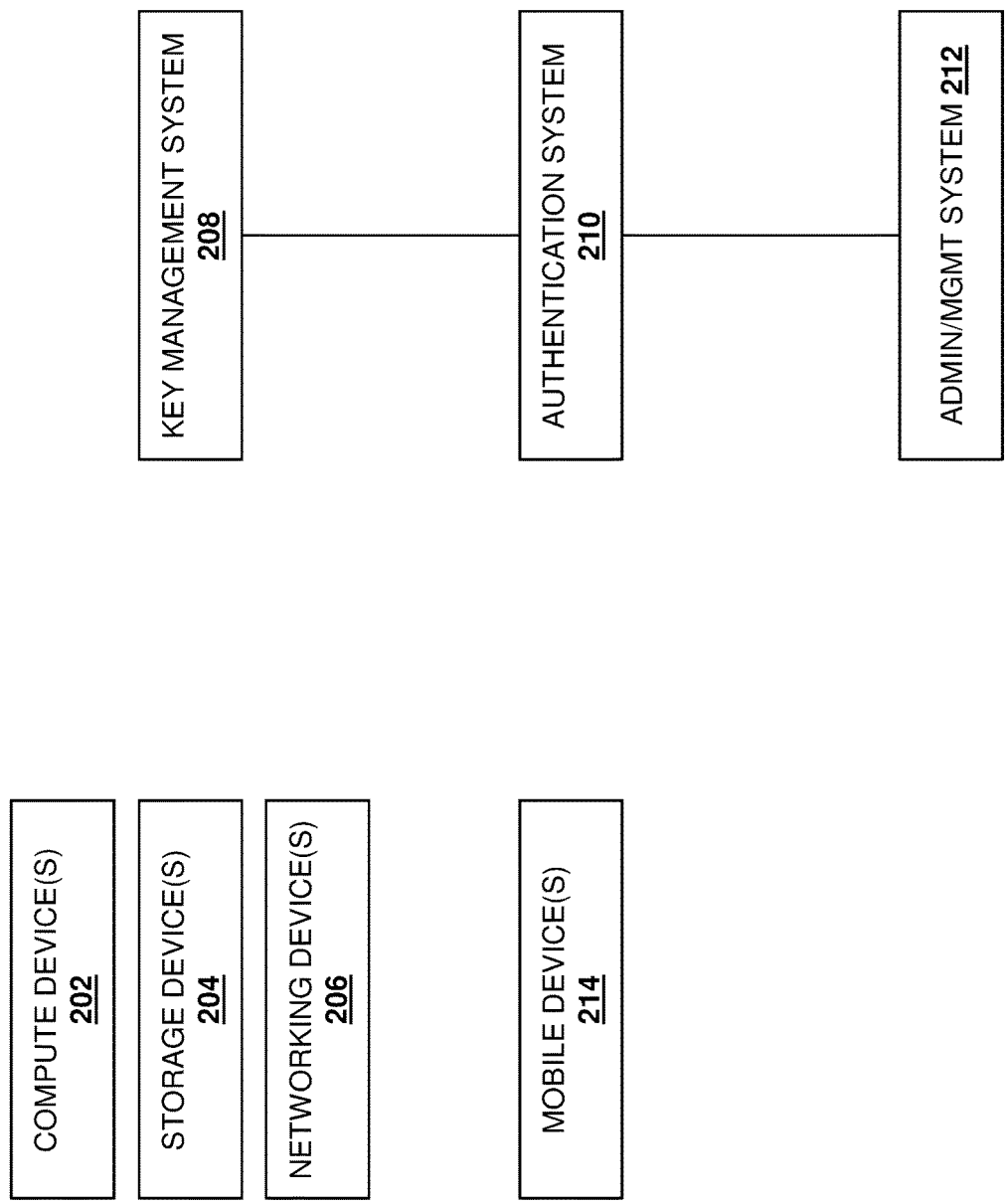
FIG. 2 is a schematic view illustrating an embodiment of a networked system that may utilize the secure infrastructure onboarding system of the present disclosure.

Referring now to FIG. 2, an embodiment of a networked system 200 is illustrated in which the secure infrastructure onboarding system of the present disclosure may be utilized.

In the examples described below, the networked system 200 is described as a datacenter, although one of skill in the art in possession of the present disclosure will appreciate that the secure infrastructure onboarding system of the present disclosure may be utilized in a variety of other situations while remaining within the scope of the present disclosure as well. In the illustrated embodiment, the networked system 200 may include a plurality of infrastructure devices that are illustrated and discussed below as including one or more compute device 202, one or more storage devices 204, and one or more networking devices 206, and one of skill in the art in possession of the present disclosure will appreciate that the secure infrastructure onboarding system of the present disclosure may be utilized to onboard any of the compute device(s) 202, storage device(s) 204, and/or networking device(s) 206 to the networked system 200/datacenter.

In an embodiment, any or all of the compute device(s) 202, storage device(s) 204, and/or networking device(s) 206 may be provided by the IHS 100 discussed above with reference to FIG. 1, and/or may include some or all of the components of the IHS 100, and in specific examples the compute device(s) 202 may be provided by server devices, the storage device(s) 204 may be provided by storage drives, and the networking device(s) may be provided by switch devices. However, while illustrated and discussed as being provided by particular devices, one of skill in the art in possession of the present disclosure will recognize that virtually any devices may be provided in and onboarded to a networked system using the techniques described herein while remaining within the scope of the present disclosure as well.

In the illustrated embodiment, the networked system 200 also includes a key management system 208. In an embodiment, the key management system 208 may be provided by the IHS 100 discussed above with reference to FIG. 1, and/or may include some or all of the components of the IHS 100, and in specific examples may be provided by an Electronic Key Management System (EKMS) server system including a plurality of redundant, load-balancing EKMS server devices that may be configured to be compliant with the Key Management Interoperability Protocol (KMIP) promulgated by the Organization for the Advancement of Structured Information Standards (OASIS), as discussed in further detail below. However, while illustrated and discussed as being provided by a particular key management system operating according to a particular key management protocol, one of skill in the art in possession of the present disclosure will recognize that the key management system included in the networked system 200 may include any devices that may be configured to operate similarly as the key management system 208 discussed below.

In the illustrated embodiment, the networked system 200 also includes an authentication system 210 that is coupled to the key management system 208 (e.g., by a wired connection in the examples below, although wireless connections between the authentication system 210 and the key management system 208 will fall within the scope of the present disclosure as well). In an embodiment, the authentication system 210 may be provided by the IHS 100 discussed above with reference to FIG. 1, and/or may include some or all of the components of the IHS 100, and in specific examples may be provided by an OAuth 2.0 server system or an OpenID Connect (OIDC) server system. However, while illustrated and discussed as being provided by a particular authentication system, one of skill in the art in possession of the present disclosure will recognize that the authentication system included in the networked system 200 may include any devices that may be configured to operate similarly as the authentication system 210 discussed below.

In the illustrated embodiment, the networked system 200 also includes an administration/management (ADMIN/MGMT) system 212 that is coupled to the authentication system 210 (e.g., by a wired connection in the examples below, although wireless connections between the administration/management system 212 and the authentication system 210 will fall within the scope of the present disclosure as well). In an embodiment, the administration/management system 212 may be provided by the IHS 100 discussed above with reference to FIG. 1, and/or may include some or all of the components of the IHS 100, and in specific examples may be provided by one or more server devices that may be configured to provide an administration/management application that is configured to maintain infrastructure device-level records (e.g., infrastructure device identities, user access roles, user access policies, etc.), generate unique infrastructure device access tokens for users (e.g., users of the mobile devices discussed below) based on their user profiles, allow a network administrator or other user to set user privileges, token timeout values, device access roles, and/or other security policies, and/or perform other administration and/or management functionality known in the art. However, while illustrated and discussed as being provided by particular administration/management devices with particular administration/management functionality, one of skill in the art in possession of the present disclosure will recognize that the administration/management system included in the networked system 200 may include any devices that may be configured to operate similarly as the administration/management system 212 discussed below.

In the illustrated embodiment, the networked system 200 may also include one or more mobile devices 214. In an embodiment, the mobile device(s) 214 may be provided by the IHS 100 discussed above with reference to FIG. 1, and/or may include some or all of the components of the IHS 100, and in specific examples may be provided by one or more laptop/notebook computer devices, tablet devices, and/or mobile phones that, as discussed below, may provide a mobile application that is configured with a vendor certificate of a vendor of the infrastructure devices and the key management system in the networked system 200 in order to allow the mobile device 214 to be utilized for handshake/authentication functionality with those infrastructure devices, as discussed in further detail below. However, while mobile devices are illustrated and discussed as being used to access infrastructure devices that have been onboarded to the networked system 200/datacenter, one of skill in the art in possession of the present disclosure will recognize that infrastructure devices included in the networked system 200 may be accessed using other devices while remaining within the scope of the present disclosure as well. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
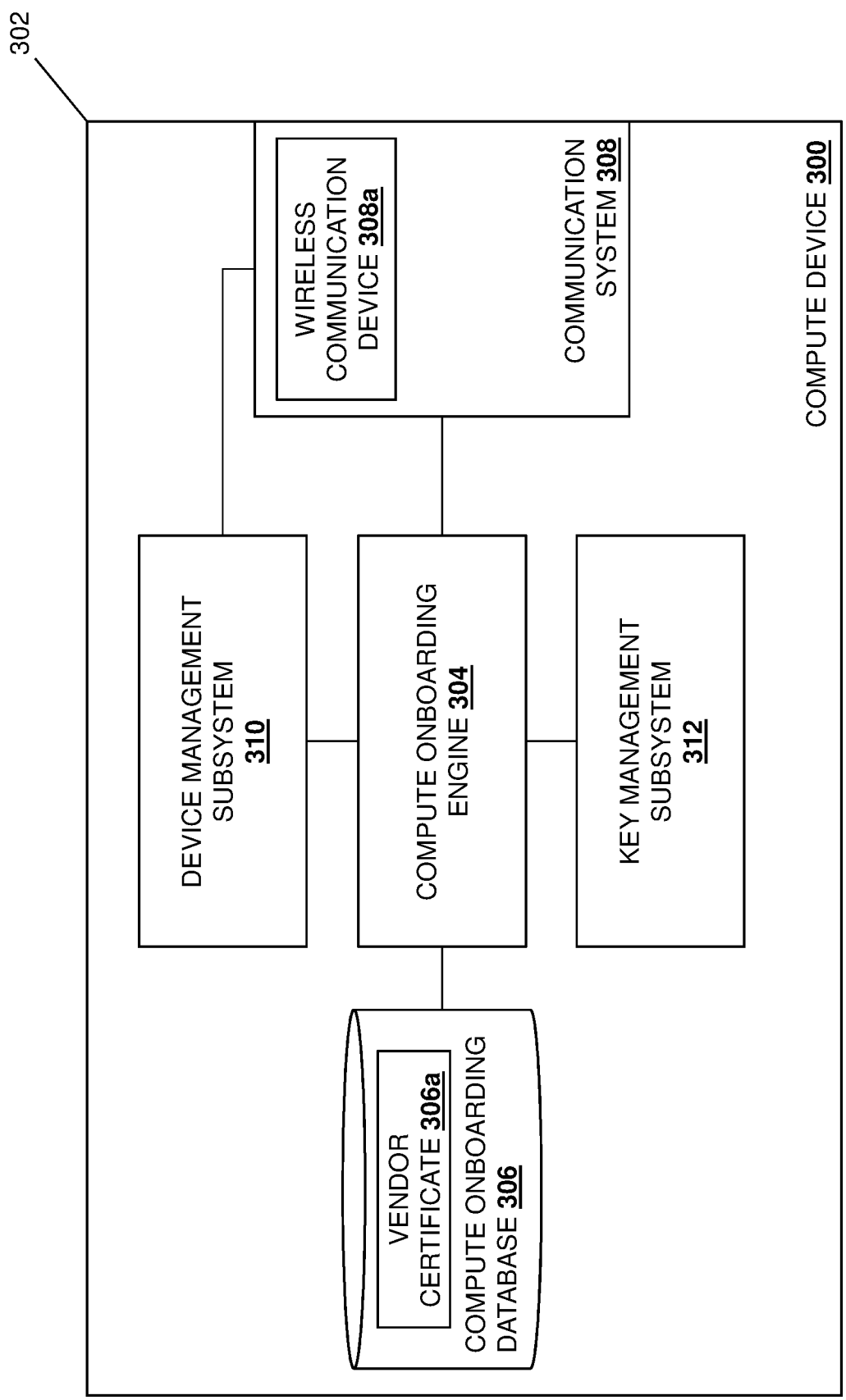
FIG. 3 is a schematic view illustrating an embodiment of a compute device that may be onboarded in the networked system of FIG. 2 according to the teachings of the present disclosure.

Referring now to FIG. 3, an embodiment of a compute device 300 is illustrated that may provide any or all of the compute devices 202 discussed above with reference to FIG. 2. As such, the compute device 300 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the compute device 300 discussed below may be provided by other devices that are configured to operate similarly as the compute device 300 discussed below. In the illustrated embodiment, the compute device 300 includes a chassis 302 that houses the components of the compute device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a compute onboarding engine 304 that is configured to perform the functionality of the compute onboarding engines and/or compute devices discussed below.

The chassis 302 may also house a storage system (not illustrated, but which may include the storage 108 discussed above with reference to FIG. 1) that is coupled to the compute onboarding engine 304 (e.g., via a coupling between the storage system and the processing system) and that includes a compute onboarding database 306 that is configured to store any of the information utilized by the compute onboarding engine 304 discussed below. In the illustrated embodiment, the compute onboarding database 306 includes a vendor certificate 306a that may have been generated and stored in the compute onboarding database 306 by a vendor of the compute device 300, discussed in further detail below.

The chassis 302 may also house a communication system 308 that is coupled to the compute onboarding engine 304 (e.g., via a coupling between the communication system 308 and the processing system) and that may be provided by a Network Interface Controller (NIC) and/or any other communication components that would be apparent to one of skill in the art in possession of the present disclosure. In particular, a wireless communication device 308a is included in the communication system 308, and may be provided by a Near Field Communication (NFC) wireless subsystem, a BLUETOOTH® wireless subsystem, a WiFi wireless subsystem, and/or other wireless subsystems known in art. In a specific example, the chassis 302 or other enclosure for the compute device 300 may include a "wireless bezel" or other wireless module that is provided by the compute device vendor and that provides the wireless communication device 308a, although wireless communication devices provided in other manners will fall within the scope of the present disclosure as well.

In the illustrated embodiment, the chassis 302 also houses a device management subsystem 310 that is coupled to the compute onboarding engine 304 (e.g., via a coupling between the device management subsystem 310 and the processing system) and the communication system 308. In an embodiment, the device management subsystem 310 may be provided by the IHS 100 discussed above with reference to FIG. 1 and/or may include some or all of the components of the IHS 100, and in specific examples may be provided by a Baseboard Management Controller (BMC) such as, for example, the integrated DELL® Remote Access Controller (iDRAC) available from DELL® Inc. of Round Rock, Tex., United States. Furthermore, while illustrated and discussed as being provided by a BMC/iDRAC, one of skill in the art in possession of the present disclosure will recognize that the functionality of the device management subsystem 312 discussed below may be provided by other devices that are configured to operate similarly as the device management subsystem 312 discussed below.

In the illustrated embodiment, the chassis 302 also houses a key management subsystem 312 that is coupled to the compute onboarding engine 304 (e.g., via a coupling between the key management subsystem 312 and the processing system). In an embodiment, the key management subsystem 312 may be provided by the IHS 100 discussed above with reference to FIG. 1 and/or may include some or all of the components of the IHS 100, and in specific examples may be provided by a KMIP-compliant hardware key management subsystem that is configured to generate the infrastructure device validation keys discussed below. Furthermore, while illustrated and discussed as being provided by a particular key management subsystem with particular key management functionality, one of skill in the art in possession of the present disclosure will recognize that the functionality of the key management subsystem 312 discussed below may be provided by other devices that are configured to operate similarly as the key management subsystem 312 discussed below. Furthermore, while a specific compute device 300 has been illustrated, one of skill in the art in possession of the present disclosure will recognize that compute devices (or other devices operating according to the teachings of the present disclosure in a manner similar to that described below for the compute device 300) may include a variety of components and/or component configurations for providing conventional compute device functionality, as well as the functionality discussed below, while remaining within the scope of the present disclosure as well.

Figure 4:
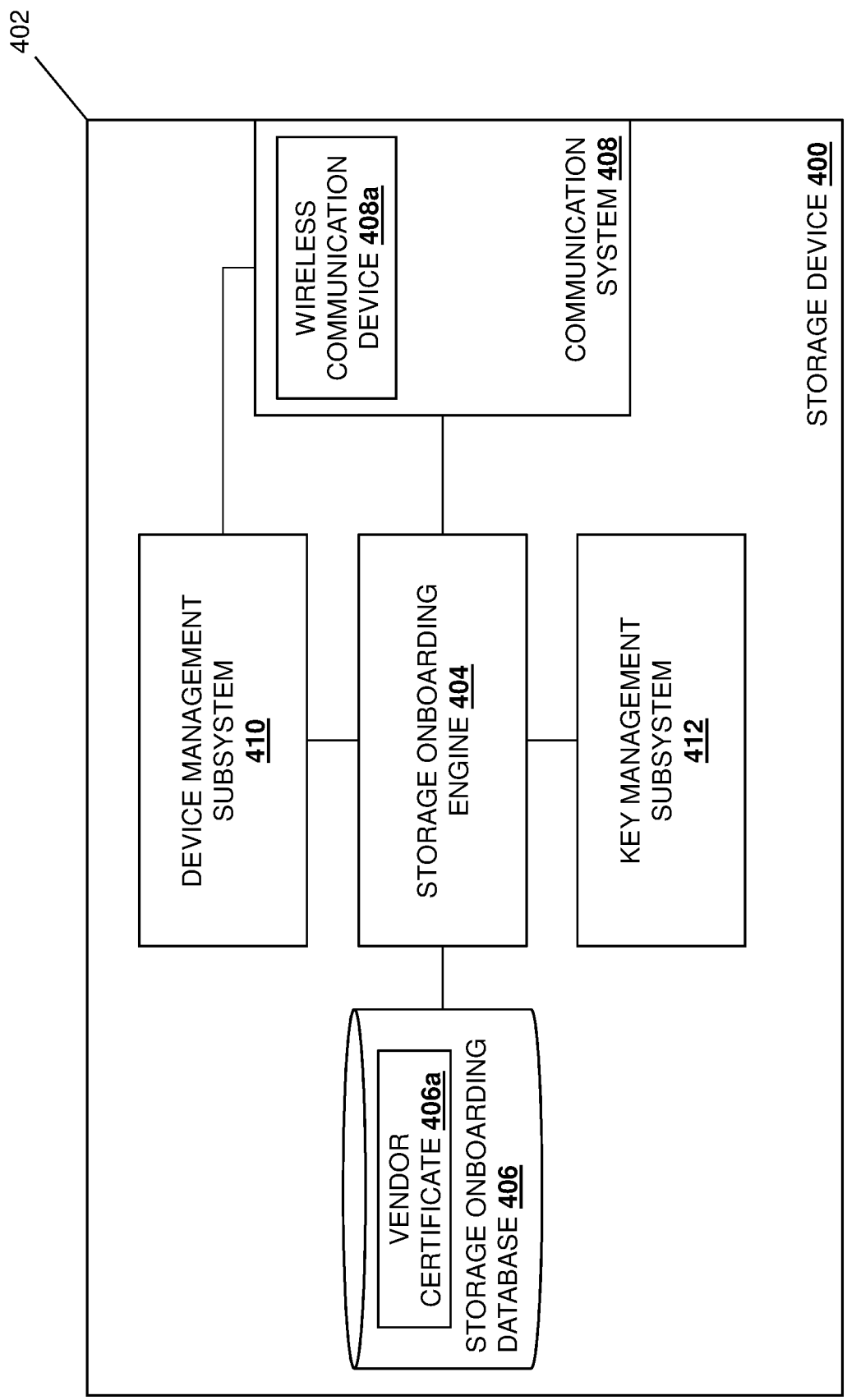
FIG. 4 is a schematic view illustrating an embodiment of a storage device that may be onboarded in the networked system of FIG. 2 according to the teachings of the present disclosure.

Referring now to FIG. 4, an embodiment of a storage device 400 is illustrated that may provide any or all of the storage devices 204 discussed above with reference to FIG. 2. As such, the storage device 400 may be provided by the IHS 100 discussed above with reference to FIG. 1 and/or may include some or all of the components of the IHS 100, and in specific examples may be provided by a storage drive. Furthermore, while illustrated and discussed as being provided by a storage drive, one of skill in the art in possession of the present disclosure will recognize that the functionality of the storage device 400 discussed below may be provided by other devices that are configured to operate similarly as the storage device 400 discussed below. In the illustrated embodiment, the storage device 400 includes a chassis 402 that houses the components of the storage device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage onboarding engine 404 that is configured to perform the functionality of the storage onboarding engines and/or storage devices discussed below.

The chassis 402 may also house a storage system (not illustrated, but which may include the storage 108 discussed above with reference to FIG. 1) that is coupled to the storage onboarding engine 404 (e.g., via a coupling between the storage system and the processing system) and that includes a storage onboarding database 406 that is configured to store any of the information utilized by the storage onboarding engine 404 discussed below. In the illustrated embodiment, the storage onboarding database 406 includes a vendor certificate 406a that may have been generated and stored in the storage onboarding database 406 by a vendor of the storage device 400, discussed in further detail below.

The chassis 402 may also house a communication system 408 that is coupled to the storage onboarding engine 404 (e.g., via a coupling between the communication system 408 and the processing system) and that may be provided by a Network Interface Controller (NIC) and/or any other communication components that would be apparent to one of skill in the art in possession of the present disclosure. In particular, a wireless communication device 408a is included in the communication system 408, and may be provided by an NFC wireless subsystem, a BLUETOOTH® wireless subsystem, a WiFi wireless subsystem, and/or other wireless subsystems known in art. In a specific example, the chassis 402 or other enclosure for the storage device 400 may include a wireless module that is provided by the storage device vendor and that provides the wireless communication device 408a, although wireless communication devices provided in other manners will fall within the scope of the present disclosure as well.

In the illustrated embodiment, the chassis 402 also houses a device management subsystem 410 that is coupled to the storage onboarding engine 404 (e.g., via a coupling between the device management subsystem 410 and the processing system) and the communication system 408. In an embodiment, the device management subsystem 410 may be provided by a storage node management module. Furthermore, while illustrated and discussed as being provided by a storage node management module, one of skill in the art in possession of the present disclosure will recognize that the functionality of the device management subsystem 412 discussed below may be provided by other subsystems that are configured to operate similarly as the device management subsystem 412 discussed below.

In the illustrated embodiment, the chassis 402 also houses a key management subsystem 412 that is coupled to the storage onboarding engine 404 (e.g., via a coupling between the key management subsystem 412 and the processing system). In an embodiment, the key management subsystem 412 may be provided by the IHS 100 discussed above with reference to FIG. 1 and/or may include some or all of the components of the IHS 100, and in specific examples may be provided by a KMIP-compliant hardware key management subsystem that is configured to generate the infrastructure device validation keys discussed below. Furthermore, while illustrated and discussed as being provided by a particular key management subsystem with particular key management functionality, one of skill in the art in possession of the present disclosure will recognize that the functionality of the key management subsystem 412 discussed below may be provided by other devices that are configured to operate similarly as the key management subsystem 412 discussed below. Furthermore, while a specific storage device 400 has been illustrated, one of skill in the art in possession of the present disclosure will recognize that storage devices (or other devices operating according to the teachings of the present disclosure in a manner similar to that described below for the storage device 400) may include a variety of components and/or component configurations for providing conventional storage device functionality, as well as the functionality discussed below, while remaining within the scope of the present disclosure as well.

Figure 5:
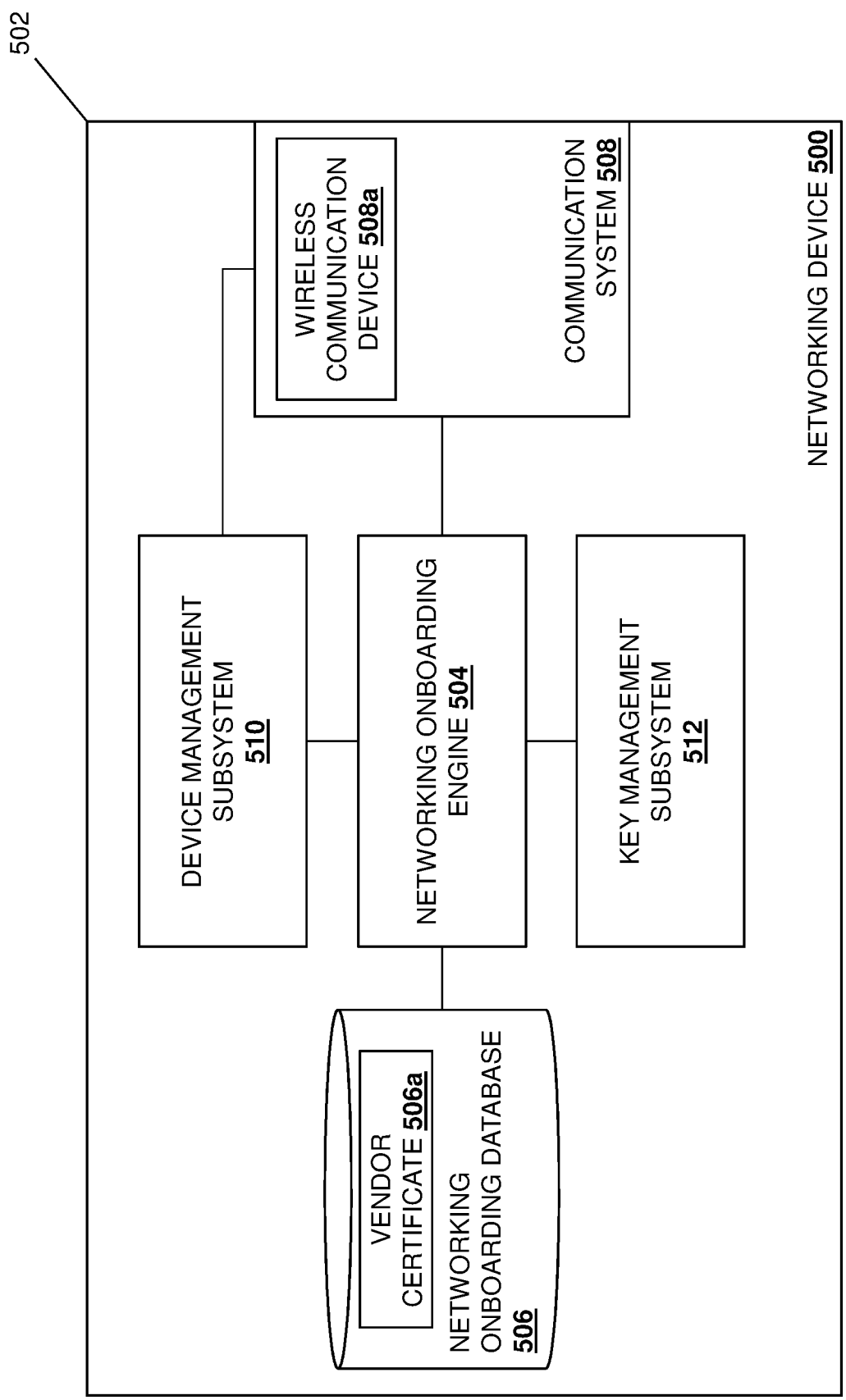
FIG. 5 is a schematic view illustrating an embodiment of a networking device that may be onboarded in the networked system of FIG. 2 according to the teachings of the present disclosure.

Referring now to FIG. 5, an embodiment of a networking device 500 is illustrated that may provide any or all of the networking devices 206 discussed above with reference to FIG. 2. As such, the networking device 500 may be provided by the IHS 100 discussed above with reference to FIG. 1 and/or may include some or all of the components of the IHS 100, and in specific examples may be provided by a switch device. Furthermore, while illustrated and discussed as being provided by a switch device, one of skill in the art in possession of the present disclosure will recognize that the functionality of the networking device 500 discussed below may be provided by other devices that are configured to operate similarly as the networking device 500 discussed below. In the illustrated embodiment, the networking device 500 includes a chassis 502 that houses the components of the networking device 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking onboarding engine 504 that is configured to perform the functionality of the networking onboarding engines and/or networking devices discussed below.

The chassis 502 may also house a storage system (not illustrated, but which may include the storage 108 discussed above with reference to FIG. 1) that is coupled to the networking onboarding engine 504 (e.g., via a coupling between the storage system and the processing system) and that includes a networking onboarding database 506 that is configured to store any of the information utilized by the networking onboarding engine 504 discussed below. In the illustrated embodiment, the networking onboarding database 506 includes a vendor certificate 506a that may have been generated and stored in the networking onboarding database 506 by a vendor of the networking device 500, discussed in further detail below.

The chassis 502 may also house a communication system 508 that is coupled to the networking onboarding engine 504 (e.g., via a coupling between the communication system 508 and the processing system) and that may be provided by a Network Interface Controller (NIC) and/or any other communication components that would be apparent to one of skill in the art in possession of the present disclosure. In particular, a wireless communication device 508a is included in the communication system 508, and may be provided by an NFC wireless subsystem, a BLUETOOTH® wireless subsystem, a WiFi wireless subsystem, and/or other wireless subsystems known in art. In a specific example, the chassis 502 or other enclosure for the networking device 500 may include a wireless module that is provided by the networking device vendor and that provides the wireless communication device 508a, although wireless communication devices provided in other manners will fall within the scope of the present disclosure as well.

In the illustrated embodiment, the chassis 502 also houses a device management subsystem 510 that is coupled to the networking onboarding engine 504 (e.g., via a coupling between the device management subsystem 510 and the processing system) and the communication system 508. In an embodiment, the device management subsystem 510 may be provided by networking operating system for the networking device 500. Furthermore, while illustrated and discussed as being provided by a networking operating system, one of skill in the art in possession of the present disclosure will recognize that the functionality of the device management subsystem 512 discussed below may be provided by other subsystems that are configured to operate similarly as the device management subsystem 512 discussed below.

In the illustrated embodiment, the chassis 502 also houses a key management subsystem 512 that is coupled to the networking onboarding engine 504 (e.g., via a coupling between the key management subsystem 512 and the processing system). In an embodiment, the key management subsystem 512 may be provided by the IHS 100 discussed above with reference to FIG. 1 and/or may include some or all of the components of the IHS 100, and in specific examples may be provided by a KMIP-compliant hardware key management subsystem that is configured to generate the vendor-specific keys discussed below. Furthermore, while illustrated and discussed as being provided by a particular key management subsystem with particular key management functionality, one of skill in the art in possession of the present disclosure will recognize that the functionality of the key management subsystem 512 discussed below may be provided by other devices that are configured to operate similarly as the key management subsystem 512 discussed below. Furthermore, while a specific networking device 500 has been illustrated, one of skill in the art in possession of the present disclosure will recognize that networking devices (or other devices operating according to the teachings of the present disclosure in a manner similar to that described below for the networking device 500) may include a variety of components and/or component configurations for providing conventional networking device functionality, as well as the functionality discussed below, while remaining within the scope of the present disclosure as well.

Figure 6:
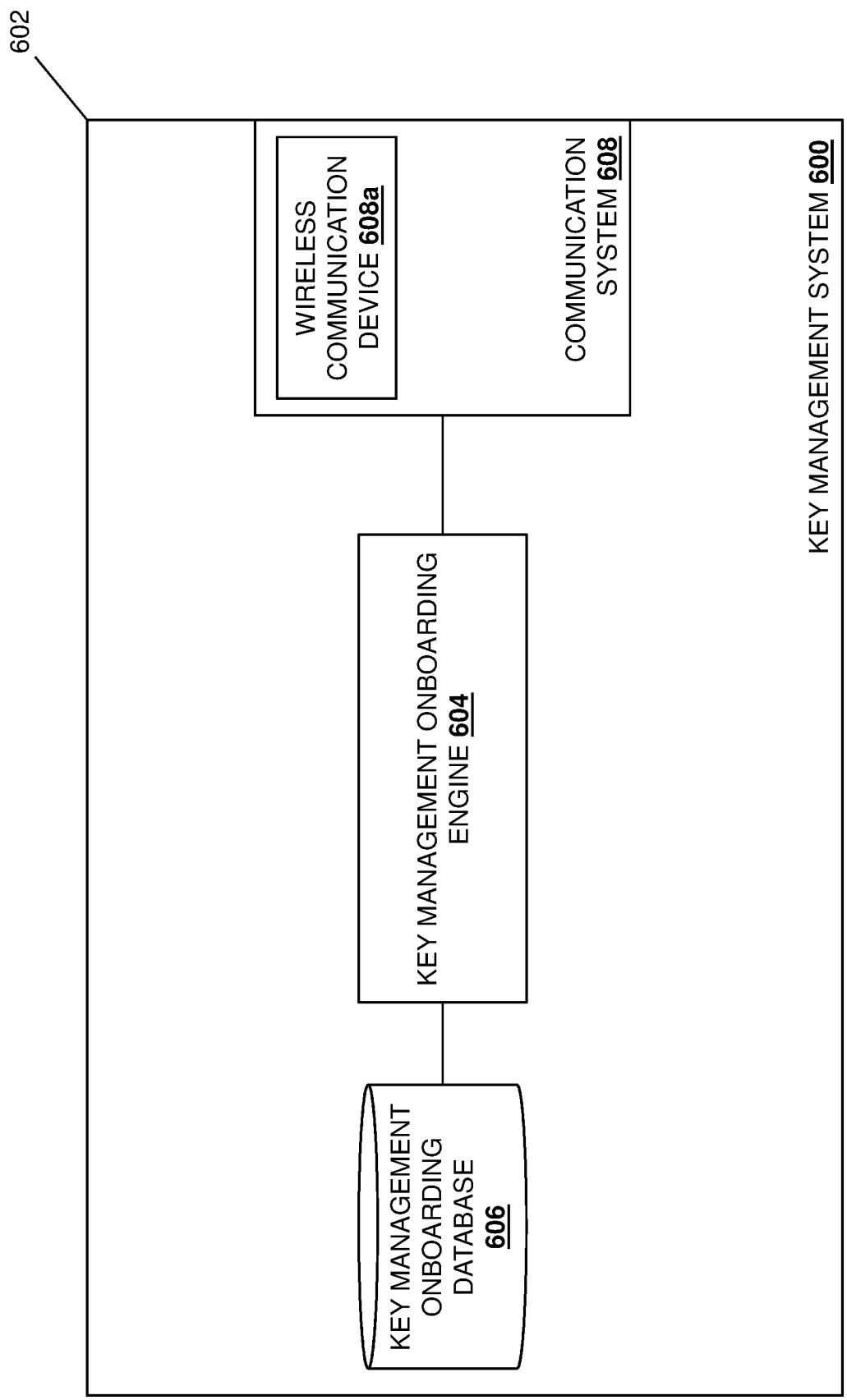
FIG. 6 is a schematic view illustrating an embodiment of a key management system that may be included in the networked system of FIG. 2.

Referring now to FIG. 6, an embodiment of a key management system 600 is illustrated that may provide the key management system 208 discussed above with reference to FIG. 2. As such, the key management system 600 may be provided by the IHS 100 discussed above with reference to FIG. 1 and/or may include some or all of the components of the IHS 100, and in specific examples may be provided an EKMS server system including a plurality of EKMS server devices (e.g., redundant/load balancing EKMS server devices) that may be configured to be compliant with the KMIP promulgated by OASIS. As such, the key management system 600 may provide for "creation" operations such as the creation of managed objects (e.g., symmetric keys) and the associated return of a corresponding identifier, "get" operations such as the retrieval of objects based on their identifier, "register" operations such as the storage of externally generated key values, "attribute handling" operations (e.g., add operations, modify operations, get operations, etc.), "locate" operations, "rekey" operations such as the creation of a new key to replace an old key, "key pair creation" operations such as the creation of asymmetric keys, "certify" operations such as the certification of a certificate, "splitting/joining" operations such as the splitting and/or joining of n-of-m keys, "encryption/decryption" operations, "import/export" operations to import or export keys to/from other KMIP systems, and/or any other operations defined by the KMIP. Furthermore, while illustrated and discussed as a particular key management system operating according to a particular protocol, one of skill in the art in possession of the present disclosure will recognize that the functionality of the key management system 600 discussed below may be provided by other devices that are configured to operate similarly as discussed below.

In the illustrated embodiment, the key management system 600 includes a chassis 602 that houses the components of the key management system 600, only some of which are illustrated below. For example, the chassis 602 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a key management onboarding engine 604 that is configured to perform the functionality of the key management onboarding engines and/or key management systems discussed below. The chassis 602 may also house a storage system (not illustrated, but which may include the storage 108 discussed above with reference to FIG. 1) that is coupled to the key management onboarding engine 604 (e.g., via a coupling between the storage system and the processing system) and that includes a key management onboarding database 606 that is configured to store any of the information utilized by the key management onboarding engine 604 discussed below.

The chassis 602 may also house a communication system 608 that is coupled to the key management onboarding engine 604 (e.g., via a coupling between the communication system 608 and the processing system) and that may be provided by a Network Interface Controller (NIC) and/or any other communication components that would be apparent to one of skill in the art in possession of the present disclosure. In particular, a wireless communication device 608a is included in the communication system 608, and may be provided by an NFC wireless subsystem, a BLUETOOTH® wireless subsystem, a WiFi wireless subsystem, and/or other wireless subsystems known in art.

In a specific example, the chassis 602 or other enclosure for the key management system 600 may include a wireless module that is provided by the key management system vendor and that provides the wireless communication device 608a, although wireless communication devices provided in other manners will fall within the scope of the present disclosure as well. However, while a specific key management system 600 has been illustrated, one of skill in the art in possession of the present disclosure will recognize that key management systems (or other devices operating according to the teachings of the present disclosure in a manner similar to that described below for the key management system 600) may include a variety of components and/or component configurations for providing conventional key management functionality, as well as the functionality discussed below, while remaining within the scope of the present disclosure as well.

Figure 7:
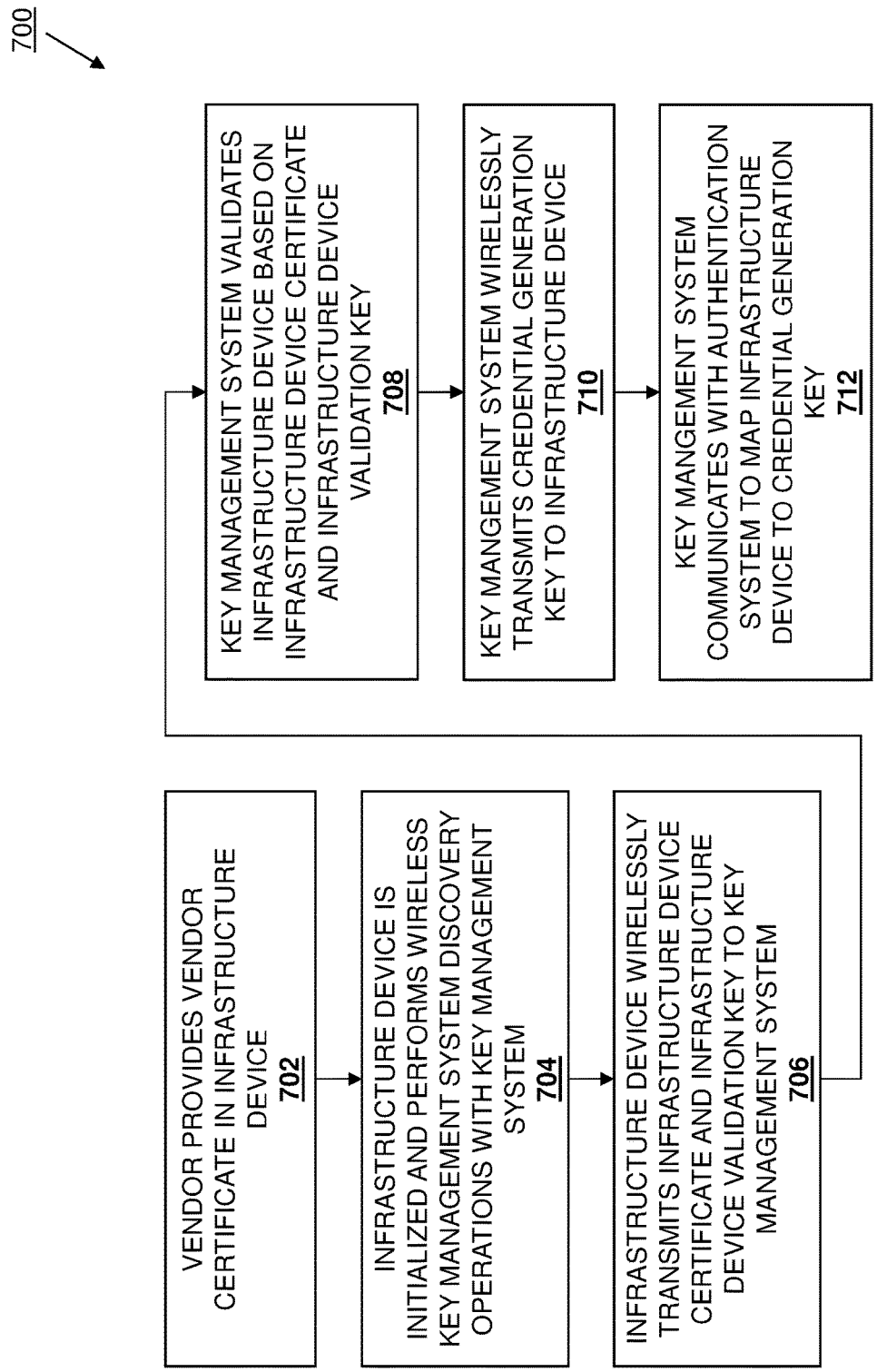
FIG. 7 is a flow chart illustrating an embodiment of a method for securely onboarding infrastructure devices in a networked system.

Referring now to FIG. 7, an embodiment of a method 700 for securely onboarding infrastructure devices in a networked system is illustrated. As discussed below, the systems and methods of the present disclosure provide for the initial setup of a datacenter or other networked system with infrastructure devices in a secure automated manner. For example, the secure infrastructure onboarding system of the present disclosure may include an infrastructure device with an infrastructure device wireless subsystem that it may use to perform wireless key management system discovery operations in response to initialization. A key management system includes a key management system wireless subsystem it uses to perform the wireless key management system discovery operations with the infrastructure device. The key management subsystem may then wirelessly receive an infrastructure device certificate along with an infrastructure device validation key from the infrastructure device, and validate the first infrastructure device based on the first infrastructure device certificate and the first infrastructure device validation key. In response, the key management system may wirelessly transmit a first credential generation key that is configured for use by the first infrastructure device to generate first authentication credentials. As such, infrastructure devices may be onboarded in a "lights-out" datacenter that utilizes remote administration in a fully autonomous and secure manner that prevents non-administrators or intruders from manipulating the onboarding process.

The method 700 begins at block 702 where a vendor provides a vendor certificate in an infrastructure device. In an embodiment, at block 702, a customer may order a plurality of infrastructure devices from a vendor, and while the examples below discuss the onboarding of a single compute device 202a included in the compute devices 202 in the networked system 200, one of skill in the art in possession of the present disclosure will recognize that any number of compute devices 202, storage devices 204, and networking devices 206 may operate similarly as the compute device 202a described below in order perform the initial onboarding and/or setup of the networked system 200 as part of the method 700. In an embodiment, as part of the order process in which the customer orders the compute device 202a from the vendor, the vendor system may collect customer identity information from the customer that ordered the compute device 202a, and store that customer identify information in a customer identity information database in the vendor system. For example, the customer identity information may include social security information, a name, an address, a phone number, an email address, and/or any other customer identity information that would be apparent to one of skill in the art in possession of the present disclosure. Furthermore, one of skill in the art in possession of the present disclosure will appreciate that any license information for the compute device 202a may be mapped to the customer identity information in a vendor licensing database in the vendor system while remaining within the scope of the present disclosure as well.

Subsequently, as part of the factory configuration process that configures the compute device 202a, the vendor system may retrieve that customer identity information (e.g., a secure identity of the customer, a device identity of the compute device 202a, and/or any other unique information associated with the customer and/or compute device that would be apparent to one of skill in the art in possession of the present disclosure), and use that customer identity information to generate a secure license for the compute device 202a/customer that ordered that compute device. The vendor system may then sign that secure license to generate a unique vendor infrastructure device certificate 306a for the compute device 202a/300, embed that vendor infrastructure device certificate 306 in the compute device 202a/300 (e.g., by storing that vendor infrastructure device certificate 306 in the compute onboarding database 306 as illustrated in FIG. 3), and then provide the compute device 202a/300 to the customer. Furthermore, one of skill in the art in possession of the present disclosure will appreciate that vendor certificates 406a and 506a may be embedded or otherwise provided in storage devices 204 and networking devices 206 ordered by customers in a similar manner as well.

As such, the vendor infrastructure device certificate 306a embedded in the compute device 202a/300 may include the identity of the customer and may be stored in hardware on the compute device 202a/300 for use in verification, authentication, and validation as described herein. In a specific example, a license embedded in the Unified Extensible Firmware Interface (UEFI) may be utilized as the vendor infrastructure device certificate 306a in the compute device 202a, and a copy of that vendor infrastructure device certificate 306a may also be tagged in the vendor database in the vendor system in order to allow its use to, for example, identify the customer or the compute device 202a. Thus, one of skill in the art in possession of the present disclosure will appreciate how unique vendor certificates generated based on identity information provided by a customer (e.g., using their account information) may be maintained in a digital locker in a vendor system, and then used to generate customer certificates for validation, verification and authentication of infrastructure devices provided to customers (in conjunction with the vendor certificates).

Figure 8A:
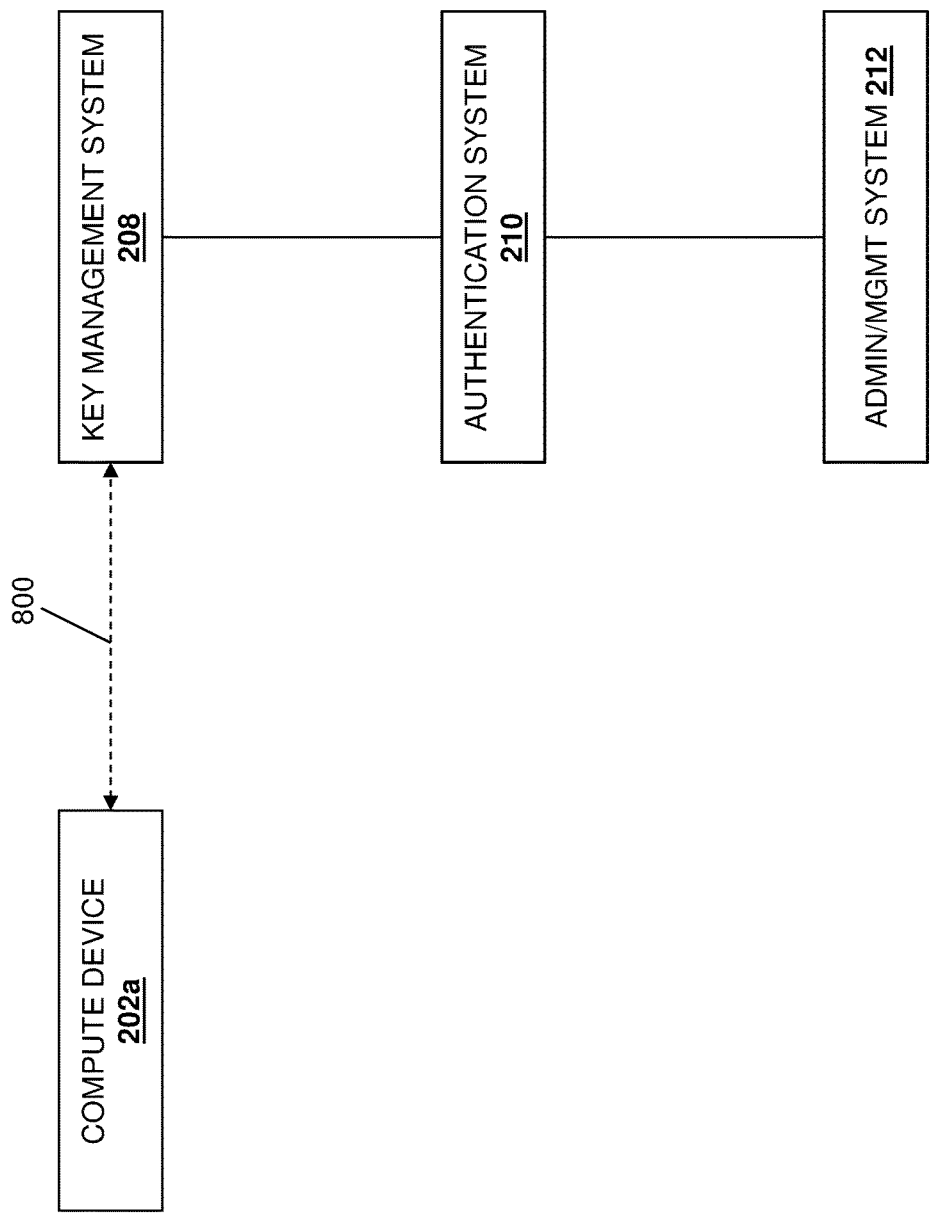
FIG. 8A is a schematic view illustrating an embodiment of a device being onboarded in the networked system of FIG. 2 during the method of FIG. 7.

The method 700 then proceeds to block 704 where the infrastructure device is initialized and performs wireless key management system discovery operations with a key management system. With reference to FIG. 8A, in an embodiment of block 704 and following the provisioning of the compute device 202a/300 in the networked system 200, the compute device 202a/300 may be powered on or otherwise initialized in a manner that allows the wireless communication device 308a in its communication system 308 to be used to perform the wireless key management system discovery operations discussed in further detail below. In a specific example, a network administrator, network technician, or other user may activate (e.g., enabled power to) the wireless module on the compute device 202a and, in response, the compute onboarding engine 304 in the compute device 202a/300 may utilize the wireless communication device 308a (e.g., via the device management subsystem 310) in order to perform wireless discovery operations with the key management onboarding engine 604 in the key management system 208/600 using its wireless module provided by the wireless communication device 608a in its communication system 608 in order to generate a wireless link 800. As will be appreciated by one of skill in the art in possession of the present disclosure, the wireless communications devices 308a and 608a (e.g., NFC wireless devices, BLUETOOTH® wireless devices, WiFi wireless devices, etc.) may perform a variety of wireless discovery operations at block 704 while remaining within the scope of the present disclosure. Furthermore, in a specific example, the initial handshake operations performed at block 704 may utilize relatively low frequency wireless communications (e.g., NFC or BLUETOOTH® wireless communications) provided by the wireless modules to perform the authentication operations below using the vendor infrastructure device certificate and infrastructure device validation keys available on the compute device 202a.

In some embodiments of block 704 and as part of the wireless key management system discovery operations, the compute onboarding engine 304 in the compute device 202a/300 may search for the key management system 208 and, upon identifying the key management system 208, may establish the wireless link 800 with the key management system 208. As discussed above, in many embodiments the compute device 202a and the key management system 208 (e.g., a vendor-specific key management server system) may be configured by the same vendor/vendor system, with that key management system 208 then installed or otherwise provided in the networked system 200 by the customer that wishes to set up that computer device 202a (and/or other infrastructure devices from that vendor) in the networked system 200. As will be appreciated by one of skill in the art in possession of the present disclosure, having the compute device 202a and the key management system 208 provided by the same vendor/vendor system allows that vendor system to configure the key management onboarding engine 604 in the key management system 208/600 to validate the vendor infrastructure device certificate 306a that was provided in the compute device 202a/300 at block 702, as well as the infrastructure device validation key generated by the compute device 202a as discussed below. However, one of skill in the art in possession of the present disclosure will recognize that other embodiments may provide the key management system 208 and the compute device 202a from different vendors, but with the complication that the vendor infrastructure device certificate validation and vendor device validation key validation functionality must be configured on the key management system 208/600 in order to allow it to validate the compute device 202a/300 as discussed below.

The method 700 then proceeds to block 706 where the infrastructure device wirelessly transmits an infrastructure device certificate and an infrastructure device validation key to the key management system. In an embodiment, the compute onboarding engine 304 in the compute device 202a/300 may retrieve an infrastructure device validation key generated by the key management subsystem 312. With reference to FIG. 8B, in an embodiment and at block 706, the compute onboarding engine 304 in the compute device 202a/300 may then perform infrastructure device authentication operations 802 that include transmitting the infrastructure device validation key and the vendor infrastructure device certificate 306a (which includes the secure license generated using unique information associated with the compute device 202a and signed by the vendor as discussed above) stored in its compute onboarding database 306 using the wireless communication device 308a in its communication system 308 (e.g., via the device management subsystem 310) and through the wireless link 800 to the key management system 208. As such, the infrastructure device validation key and the vendor infrastructure device certificate 306a are received by the key management onboarding engine 604 in key management system 208/600 via its wireless communication device 608a in its communicating system 608 at block 706.

The method 700 then proceeds to block 708 where the key management system validates the infrastructure device based on the infrastructure device certificate and the infrastructure device validation key. In an embodiment, at block 708, the key management onboarding engine 604 in the key management system 208/600 may operate to validate the compute device 202a based on the infrastructure device validation key and the vendor infrastructure device certificate received at block 706, and as discussed above the key management onboarding engine 604 in the key management system 208/600 may have been configured to perform those compute device validation operations by a common vendor of the compute device 202a and the key management system 208 (although as discussed above infrastructure device validation operations may be performed for an infrastructure device by a key management subsystem from a different vendor while remaining within the scope of the present disclosure as well). For example, the compute device validation operations may include the key management onboarding engine 604 in the key management system 208/600 checking a payload signature provided using the infrastructure device validation key, the vendor infrastructure device certificate, and/or any of the other information received from the compute device 202a at block 706.

The method 700 then proceeds to block 710 where the key management system wirelessly transmits a credential generation key to the infrastructure device. With reference to FIG. 8C, in an embodiment of block 710 and following the validation of the compute device 202a, the key management onboarding engine 604 in the key management system 208/600 may perform credential key generation operations 804 that include generating or otherwise retrieving a credential generation key, and transmitting that credential generation key to the compute device 202a using the wireless communication device 608a in its communication system 608 and via the wireless link 800 to the compute device 202a. As such, the credential generation key is received by the compute onboarding engine 304 in compute device 202a/300 via its wireless communication device 308a in its communicating system 308 (and through its device management subsystem 310) at block 710, and may be stored in its compute onboarding database 306.

As will be appreciated by one of skill in the art in possession of the present disclosure, the credential generation key provided to the compute device 202a at block 710 may subsequently allow the compute device 202a to generate network subsystem 200-/datacenter-specific authentication keys that are associated with the networked system 200 and that allow for network system/datacenter operations by the compute device 202a in the datacenter/networked system 200. As such, the method 700 provides for the onboarding of the compute device 202a to the networked system 200 in a secure automated manner that one of skill in the art in possession of the present disclosure will recognize prevents non-administrators or intruders from manipulating the onboarding process. Furthermore, as discussed below, following authentication of the compute device 202a, the compute device 202a may be configured to generate credential generation keys for other infrastructure devices that are added to the networked system 200 as part of the onboarding process for those infrastructure devices. For example, onboarded infrastructure devices may communicate with the key management system 208/600 and the authentication system 210 in order to generate and validate credential generation keys for any new infrastructure device during its onboarding process.

The method 700 then proceeds to block 712 where the key management system communicates with an authentication system to map the infrastructure device to the credential generation key. With reference to FIG. 8D, in an embodiment of block 712, the key management onboarding engine 604 in the key management system 208/600 may perform infrastructure device/credential generation key mapping operations 806 that include communicating with the authentication system 210 in order to generate and store a compute device/credential generation key mapping in the authentication system 210. For example, the infrastructure device/credential generation key mapping operations 806 may be periodically performed as part of authentication synchronization operations between the key management system 208 and the authentication system 210, and the resulting compute device/credential generation key mapping may map credential generation keys with account information associated with infrastructure devices (e.g., the compute device 202a in the example above) in the networked system 200, and may be utilized for user-based/policy-based account access to infrastructure devices as discussed below.

Figure 9:
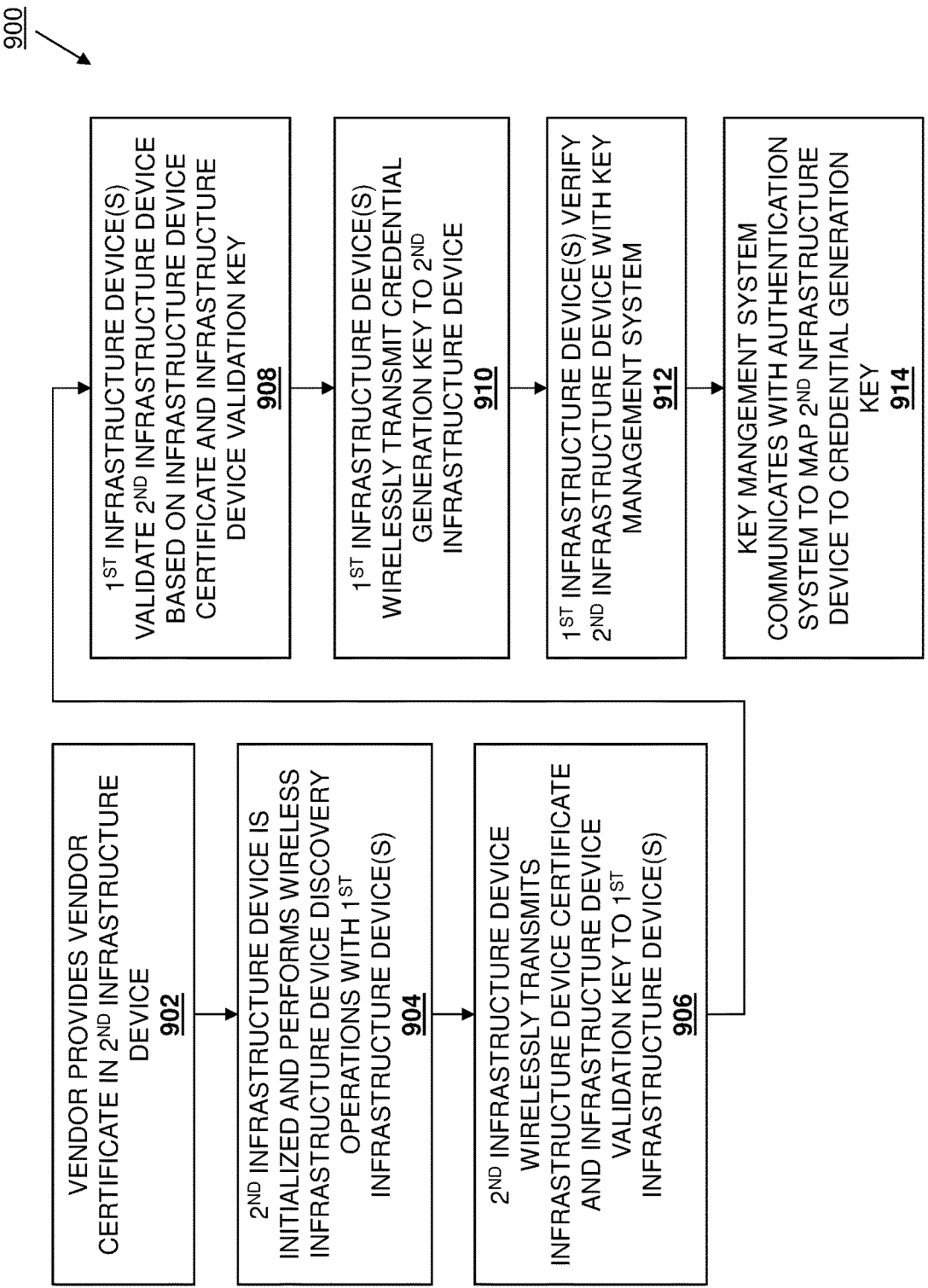
FIG. 9 is a flow chart illustrating an embodiment of a method for securely onboarding infrastructure devices in a networked system.

Referring now to FIG. 9, an embodiment of a method 900 for securely onboarding infrastructure devices in a networked system is illustrated. As discussed below, the systems and methods of the present disclosure provide for the addition of infrastructure devices to an existing datacenter or other networked system in a secure automated manner. For example, the secure infrastructure onboarding system of the present disclosure may include a second infrastructure device with a second infrastructure device wireless subsystem that it may use to perform wireless infrastructure device discovery operations in response to initialization. A first infrastructure device includes a first infrastructure device wireless subsystem it uses to perform the wireless infrastructure device discovery operations with the second infrastructure device. The first infrastructure device may then wirelessly receive a second infrastructure device certificate along with a second infrastructure device validation key from the second infrastructure device, and validate the second infrastructure device based on the second infrastructure device certificate and the second infrastructure device validation key. In response, the first infrastructure device may wirelessly transmit a second credential generation key that is configured for use by the second infrastructure device to generate second authentication credentials. As such, infrastructure devices may be onboarded to an existing datacenter that utilizes remote administration in a fully autonomous and secure manner that one of skill in the art in possession of the present disclosure will recognize prevents non-administrators or intruders from manipulating the onboarding process.

The method 900 begins at block 902 where a vendor provides a vendor certificate in a second infrastructure device. In an embodiment, at block 902, a customer may order an infrastructure device from a vendor, and while the examples below discuss the onboarding of a single compute device 202b in the networked system 200, one of skill in the art in possession of the present disclosure will recognize that any number of compute devices 202, storage devices 204, and networking devices 206 may operate similarly as the compute device 202a described below in order to be added to the networked system 200 as part of the method 900. In an embodiment, as part of the order process in which the customer orders the compute device 202b from the vendor, the vendor system may collect customer identity information from the customer that ordered the compute device 202b, and store that customer identify information in a customer identity information database in the vendor system. For example, the customer identity information may include social security information, a name, an address, a phone number, an email address, and/or any other customer identity information that would be apparent to one of skill in the art in possession of the present disclosure. Furthermore, one of skill in the art in possession of the present disclosure will appreciate that any license information for the compute device 202b and/or customer that ordered it may be mapped to the customer identity information in the customer identity information database in the vendor system.

Subsequently, as part of the factory configuration process that configures the compute device 202b, the vendor system may retrieve that customer identity information (e.g., a secure identity of the customer, a device identity of the compute device 202b, and/or any other unique information associated with the customer and/or compute device that would be apparent to one of skill in the art in possession of the present disclosure), and use that customer identity information to generate a secure license. The vendor system may then sign that secure license to generate a unique vendor infrastructure device certificate 306a for the compute device 202b/300, embed that vendor infrastructure device certificate 306 in the compute device 202b/300 (e.g., by storing that vendor infrastructure device certificate 306 in the compute onboarding database 306 as illustrated in FIG. 3), and then provide the compute device 202b/300 to the customer. Furthermore, one of skill in the art in possession of the present disclosure will appreciate that vendor certificates 406a and 506a may be embedded or otherwise provided in storage devices 204 and networking devices 206 ordered by customers in a similar manner as well.

As such, the vendor infrastructure device certificate 306a embedded in the compute device 202b/300 may include the identity of the customer and may be stored in hardware on the compute device 202b/300 for use in verification, authentication, and validation as described herein. For example, in the compute device 202b, a license embedded in the Unified Extensible Firmware Interface may be utilized as the vendor infrastructure device certificate 306a, and the vendor infrastructure device certificate 306a may also be tagged in a vendor database in the vendor system in order to allow its use to, for example, identify the customer or the compute device 202b. Thus, one of skill in the art in possession of the present disclosure will appreciate how the vendor infrastructure device certificate 306a may be associated with a vendor certificate of the vendor that may be used for decryption of identity information transmitted by the compute device 202/300.

The method 900 then proceeds to block 904 where the second infrastructure device is initialized and performs wireless infrastructure device discovery operations with first infrastructure device(s). With reference to FIG. 10A, in an embodiment of block 904 and following the provisioning of the compute device 202b/300 in the networked system 200, the compute device 202b/300 may be powered on or otherwise initialized in a manner that allows the wireless communication device 308a in its communication system 308 to be used to perform the wireless infrastructure device discovery operations discussed in further detail below. In a specific example, a network administrator, network technician, or other user may activate (e.g., provide power to) the wireless module on the compute device 202b and, in response, the compute onboarding engine 304 in the compute device 202b/300 may utilize the wireless communication device 308a (e.g., via the device management subsystem 310) in order to perform wireless discovery operations with one or more of the compute device(s) 202 that were previously onboarded to the networked system 200 via their wireless module provided by their wireless communication device 308a in their communication system 308 in order to generate a wireless link 1000.

However, while the compute device 202b is illustrated and described as being added to the networked system 200 via wireless communications with other compute devices 202, one of skill in the art in possession of the present disclosure will recognize that the onboarding operations described for the compute device 202b that is performed by the compute devices 202 below may be performed by the storage devices 204 and/or the networking devices 206 in a similar manner while remaining within the scope of the present disclosure as well. As will be appreciated by one of skill in the art in possession of the present disclosure, the wireless communications devices 308a in compute device 202b and the compute device(s) 202 (e.g., NFC wireless devices, BLUETOOTH® wireless devices, WiFi wireless devices, etc.) may perform a variety of wireless discovery operations at block 904 while remaining within the scope of the present disclosure. Furthermore, in a specific example, the initial handshake operations performed at block 904 may utilize relatively low frequency wireless communications (e.g., NFC or BLUETOOTH® wireless communications) provided by the wireless modules in the compute devices 202 and 202b that provide for the authentication operations below using the vendor infrastructure device certificate and infrastructure device validation keys available on the compute device 202b.

In an embodiment, at block 904 and as part of the wireless infrastructure device discovery operations, the compute onboarding engine 304 in the compute device 202b/300 may search for other infrastructure devices and, upon identifying the compute device(s) 202 may establish corresponding wireless link(s) 1000 with each of those compute devices 202. As discussed above, in many embodiments the compute device 202b and the compute devices 202 may be configured by the same vendor/vendor system, with the compute device (s) 202 having been previously onboarded to the networked system 200 according to the method 700 discussed above, or according to the method 900 discussed in further detail below. As will be appreciated by one of skill in the art in possession of the present disclosure, having the compute device 202b and the compute device(s) 202 that onboard it provided by the same vendor/vendor system allows that vendor system to configure the compute onboarding engine 304 in the compute devices 202/300 to validate the vendor infrastructure device certificate 306a that was provided in the compute device 202b/300 at block 904, as well as the infrastructure device validation key generated by the compute device 202b/300 as discussed below. As such, some embodiments of block 904 may include the compute device 202b/300 searching for compute devices 202 in the networked system 200 that have been configured by the vendor that configured the compute device 202b/300 and, in response, transmitting a discovery/onboarding request to those compute device(s) 202 (or other infrastructure devices). However, one of skill in the art in possession of the present disclosure will recognize that other embodiments may provide the compute device(s) 202 (or other infrastructure devices) and the compute device 202b from different vendors, but with the complication that the vendor infrastructure device certificate validation and vendor device validation key validation functionality must be provided on the compute device(s) 202 (or other infrastructure devices) in order to allow them to validate the compute device 202b/300 as discussed below.

In the examples discussed below, the compute device 202b performs the onboarding process with multiple compute devices 202, which operates to provide for the validation of the compute device 202b that is being added to the networked system 200 by multiple infrastructure devices (e.g., the compute devices 202 in the examples below). However, while onboarding process of the compute device 202b is described as being performed by each of the compute devices 202 at the same time, one of skill in the art in possession of the present disclosure will appreciate that each compute device 202 may perform onboarding operations for the compute device 202b in a "chained" or "one-after-the-other" fashion in order to, for example, avoid any wireless frequency issues with multiple wireless transmissions that could possibly occur when using the wireless links 1000 at the same time. Furthermore, in some embodiments, a threshold number of new infrastructure devices may be allowed to onboard to the networked system 200 at any particular time in order to, for example, avoid the flooding of requests for onboarding to the existing infrastructure devices.

The method 900 then proceeds to block 906 where the second infrastructure device wirelessly transmits an infrastructure device certificate and an infrastructure device validation key to the first infrastructure device(s). In an embodiment, at block 906, the compute onboarding engine 304 in the compute device 202b/300 may retrieve an infrastructure device validation key that was generated by its key management subsystem 312. With reference to FIG. 10B, in an embodiment and at block 906, the compute onboarding engine 304 in the compute device 202b/300 may then perform infrastructure device authentication operations 1002 that include transmitting the infrastructure device validation key and the vendor infrastructure device certificate 306a (which includes the secure license generated using unique information associated with the compute device 202b and signed by the vendor) stored in its compute onboarding database 306 using the wireless communication device 308a in its communication system 308 (e.g., via the device management subsystem 310) and through the wireless links 1000 to each of the compute devices 202. As such, the infrastructure device validation key and the vendor infrastructure device certificate 306a are received by the compute onboarding engine 304 in compute device(s) 202/300 via their wireless communication devices 308a in their communication system 308 at block 906.

The method 900 then proceeds to block 908 where the first infrastructure device(s) validate the second infrastructure device based on the infrastructure device certificate and the infrastructure device validation key. In an embodiment, at block 908, the compute onboarding engine 304 in each of the compute device(s) 202/300 may operate to validate the compute device 202b based on the infrastructure device validation key and the vendor infrastructure device certificate received at block 906, and as discussed above the compute onboarding engine 304 in each of the compute device(s) 202/300 may have been configured to perform those compute device validation operations by a common vendor of the compute device 202b and the compute device (s) 202 (although as discussed above infrastructure device validation operations may be performed for an infrastructure device by other infrastructure devices from a different vendor while remaining within the scope of the present disclosure as well). For example, the compute device validation operations may include the compute onboarding engine 304 in the compute device(s) 202 checking a payload signature provided using using infrastructure device validation key, the vendor infrastructure device certificate, and/or any of the other information received from the compute device 202b at block 906

The method 900 then proceeds to block 910 where the first infrastructure device(s) wirelessly transmit a credential generation key to the second infrastructure device. With reference to FIG. 10C, in an embodiment of block 910 and following the validation of the compute device 202b, the compute onboarding engine 304 in each of the compute device(s) 202 may perform credential key generation operations 1004 that include generating or otherwise retrieving a credential generation key, and transmitting that credential generation key to the compute device 202b using the wireless communication device 308a in its communication system 308 and via the wireless link 1000 to the compute device 202b. As such, the credential generation key is received by the compute onboarding engine 304 in compute device 202b/300 via its wireless communication device 308a in its communicating system 308 and through its device management subsystem 310 at block 910, and may be stored in its compute onboarding database 306. Thus, each of the compute devices 202 may provide a credential generation key to the compute device 202b (e.g., as coordinated by the key management system 208/600), which operates to set the credential generation key for the compute device 202b.

As will be appreciated by one of skill in the art in possession of the present disclosure, the credential generation key provided to the compute device 202b at block 910 may allow the compute device 202b to generate network system 200/datacenter authentication keys that are associated with the networked system 200 and that allow for network system/datacenter operations by the compute device 202b. Following such authentication, the compute device 202b may connect via the authentication system 210 to the administration/management system 212, and may operate to categorize the compute device 202b in the authentication system 210 based on its device type (e.g., a compute device type in this example) and any enterprise policies. As such, one of skill in the art in possession of the present disclosure will appreciate that the method 900 provides for the onboarding of the compute device 202b to the networked system 200 in a secure automated manner that prevents non-administrators or intruders from manipulating the onboarding process. Furthermore, as discussed below, following authentication of the compute device 202b, the compute device 202b may be configured to generate credential generation keys for other infrastructure devices that are added to the networked system 200 as part of the onboarding process for those infrastructure devices.

Figure 10E:
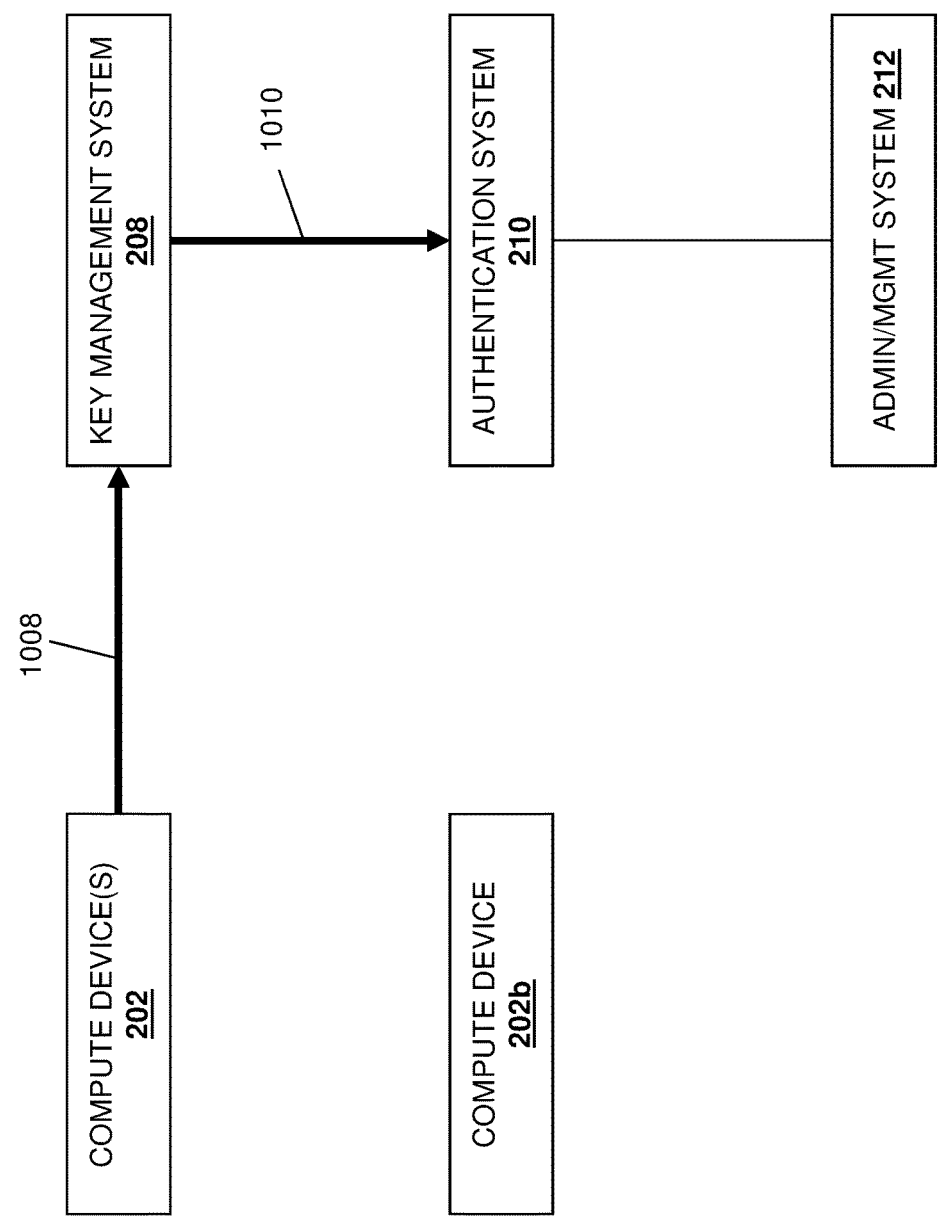
FIG. 10E is a schematic view illustrating an embodiment of a device being onboarded in the networked system of FIG. 2 during the method of FIG. 9.

The method 900 then proceeds to block 912 where the first infrastructure device(s) verify the second infrastructure device with a key management system. With reference to FIGS. 10D and 10E, in an embodiment of block 912, the compute onboarding engine 304 in each of the compute device(s) 202 may then establish a wireless link 1006 with the key management system 208 (e.g., in substantially the same manner as the wireless link 800 discussed above) and, in response, perform verification operations 1008 via that wireless link 1006 in order to verify the compute device 202b. For example, at or prior to block 912, the compute onboarding engine 304 in each of the compute device(s) 202 may identify the compute device 202b via its Media Access Control (MAC) address and/or unique service tag, and then transmit that MAC address and/or unique service tag to the key management system 208 so that the key management onboarding engine 604 in the key management system 208/600 may verify that the compute device 202b is eligible for onboarding to the networked system 200 (e.g., by verifying the existence of that MAC address and/or unique service tag in its key management onboarding database 606). Furthermore, the compute onboarding engine 304 in each of the compute device(s) 202 may utilize the unique service tag or other identifiers for the compute device 202b as the name of the corresponding wireless link to the compute device 202b in order to internally identify the compute device 202b.

The method 900 then proceeds to block 914 where the key management system communicates with an authentication system to map the second infrastructure device to the credential generation key. With reference to FIG. 10E, in an embodiment of block 914, the key management onboarding engine 604 in the key management system 208/600 may perform infrastructure device/credential generation key mapping operations 1010 that include communicating with the authentication system 210 in order to generate and store a compute device/credential generation key mapping in the authentication system 210. For example, the infrastructure device/credential generation key mapping operations 1010 may be periodically performed as part of authentication synchronization operations between the key management system 208 and the authentication system 210, and the resulting compute device/credential generation key mapping may map credential generation keys with account information associated with infrastructure devices (e.g., the compute device 202b in the examples below) in the networked system 200, and may be utilized for policy-based account access as discussed below.

Figure 11:
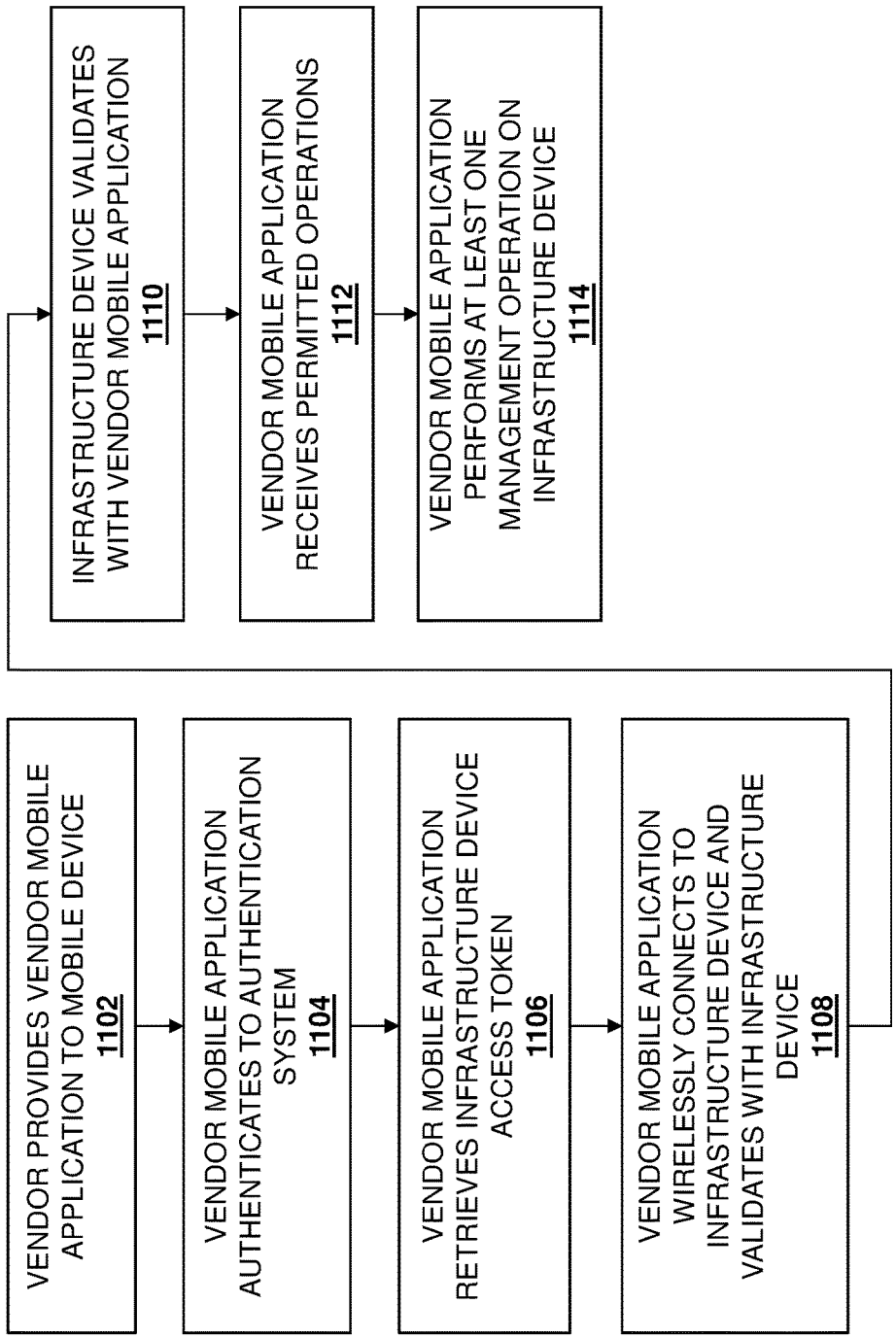
FIG. 11 is a schematic view illustrating of a method for securely accessing infrastructure devices in a networked system.

Referring now to FIG. 11, an embodiment of a method 1100 for securely accessing infrastructure devices in a networked system is illustrated. As discussed below, the systems and methods of the present disclosure provide for the secure accessing of the infrastructure devices in a networked system via a mobile application provided on a mobile device.

The method 1100 begins at block 1102 where a vendor provides a vendor mobile application to a mobile device. In an embodiment, at block 1102, any of the mobile devices 214 may be provided with a vendor mobile application by a vendor that may have provided the infrastructure devices and the key management system 208 in the networked system 200. As discussed in further detail below, the vendor mobile application may have access to a unique vendor mobile device certificate that is provided for the customer for the handshake and authentication operations (e.g., OPENMANAGE® mobile handshake/authentication operations) discussed below, and may have access to keys that can be utilized for the authentication of hardware. For example, the vendor mobile application may have access to a vendor root key and customer/device identity information (e.g., in the vendor system), and may use that vendor root key and customer/device identify information to "reset" the infrastructure device certificates 306a, 406a, and 506a discussed above that are unique to each of those infrastructure devices in order to support authentication of the vendor mobile application with those infrastructure devices. Furthermore each vendor mobile application/mobile device 214 may include a wireless communication subsystem (e.g., an NFC communication subsystem, a BLUETOOTH® communication subsystem, a WiFi communication subsystem, etc.) that may be configured to perform the handshake and authentication operations discussed below via the wireless modules provided on the infrastructure devices. In some embodiments, the vendor mobile application may be utilized to communicate and authenticate with the vendor system, synchronize the latest vendor certificates from a vendor database (e.g., during a customer/vendor mobile application enrollment process), and/or retrieve a vendor certificate from a vendor database in the vendor system for use in the infrastructure device reset scenarios discussed below.

As described below, the vendor mobile application may be configured for use in generating security tokens that may then subsequently be used to authenticate with infrastructure devices, with each security token unique to the user of the mobile device and/or the role of that user, and with the security tokens capable of being provided as dynamic, time-bound security tokens in some embodiments. As discussed above, the administrative/management system 212 may be configured to communicate with the mobile devices 214 to generate unique infrastructure device access tokens for mobile device users based on their user profiles, with those infrastructure device access token controlling access by those users to the infrastructure devices. As such, an administrator or other user may configure the vendor mobile applications on the mobile devices 214 to set user privileges, token time-outs, device access roles, and/or other features in order to enable users of the mobile devices 214 to perform initial provisioning operations, operating system deployment operations, networking configuration operations, backup operations, and/or other access/management operations that would be apparent to one of skill in the art in possession of the present disclosure.

Figure 12B:
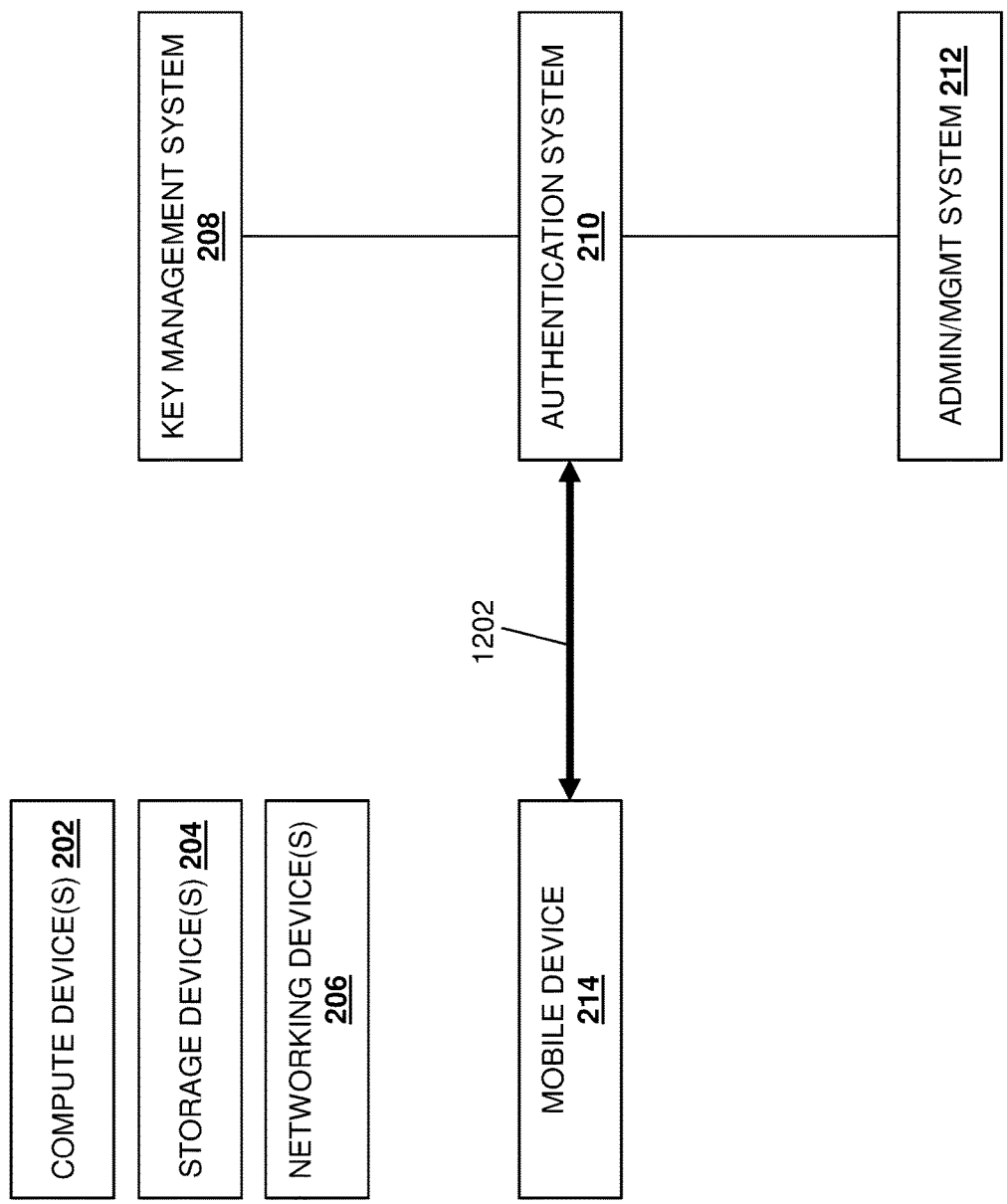
FIG. 12B is a schematic view illustrating an embodiment of a secure infrastructure access operations in the networked system of FIG. 2 during the method of FIG. 11.

The method 1100 then proceeds to block 1104 where the vendor mobile application authenticates to an authentication system. With reference to FIGS. 12A and 12B, in an embodiment of block 1104, the mobile device 214 may establish a wireless link 1200 with the authentication system 210, and a user of the mobile device 214 may perform login operations 1202 to login to the vendor mobile application via the authentication system 210 by, for example, providing a token or credentials (e.g., an OAuth 2.0 token or OIDC credentials).

Figure 12C:
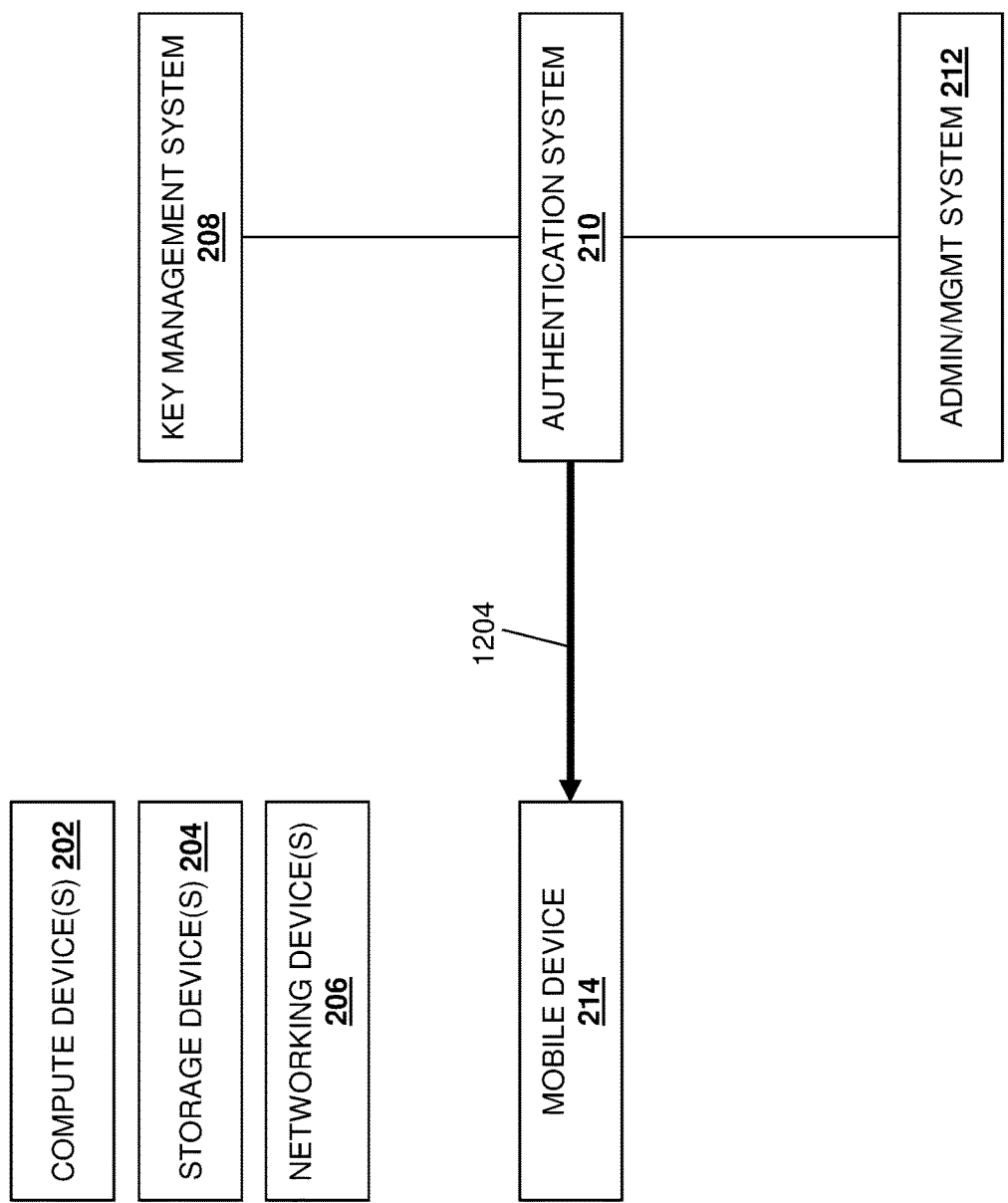
FIG. 12C is a schematic view illustrating an embodiment of a secure infrastructure access operations in the networked system of FIG. 2 during the method of FIG. 11.

The method 1100 then proceeds to block 1106 where the vendor mobile application retrieves an infrastructure device access token. With reference to FIG. 12C, in an embodiment of block 1106 and in response to the user logging into the vendor mobile application, the authentication system 210 may then perform token transmission operations 1204 to transmit infrastructure device access token(s) generated for the user/mobile device 214 that, as discussed above, regulate access by that user to infrastructure devices based on their user profile (e.g., as set by a network administrator or other user).

Figure 12D:
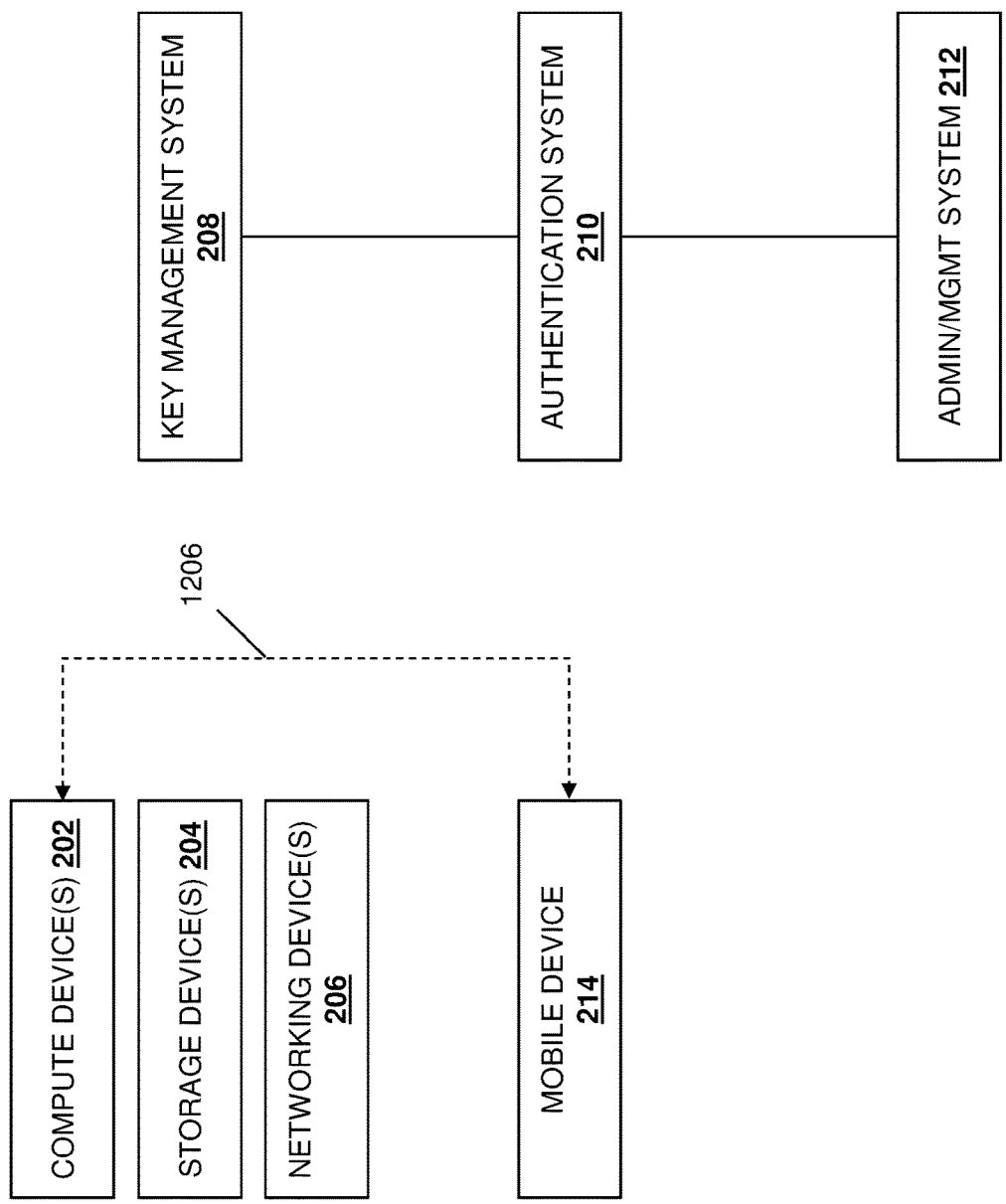
FIG. 12D is a schematic view illustrating an embodiment of a secure infrastructure access operations in the networked system of FIG. 2 during the method of FIG. 11.

The method 1100 then proceeds to block 1108 where the vendor mobile application wirelessly connects to an infrastructure device and validates with the infrastructure device. With reference to FIG. 12D, in an embodiment of block 1108, the user of the mobile device 214 may then find the infrastructure device (e.g., one of the compute devices 202 in this example) to configure, set authentication, or perform other operations on, and establish a wireless link 1206 (e.g., a BLUETOOTH® link) using the mobile device 214 and the wireless module on that compute device 202. In response to establishing the wireless link 1206 to the compute device 202, an identifier for that compute device 202 may be displayed on the mobile device 214 (e.g., in order to confirm with the user of the mobile device 214 which infrastructure device is being accessed).

The method 1100 then proceeds to block 1110 where the infrastructure device validates with the vendor mobile application. In an embodiment, at block 1110, the user of the mobile device 214 may then select the infrastructure device access token that was retrieved at block 1106 for that compute device 202 and, in response, the mobile device 214 will perform token transmission operations 1208 to transmit that infrastructure device access token to the compute device 202. In response to receiving the infrastructure device access token from the mobile device 214, the compute device 202 may operate to verify the validity of that infrastructure device access token and any user privileges that are associated with that infrastructure device access token. Furthermore, as illustrated in FIG. 12F, the compute device 202 may then perform certificate transmission operations 1210 to transmit its vendor infrastructure device certificate to the mobile device 214 via the wireless link 1206, and the vendor mobile application on the mobile device 214 may operate to verify that vendor infrastructure device certificate in order to complete the "handshake" operations.

The method 1100 then proceeds to block 1112 where the vendor mobile application receives permitted operations. With reference to FIG. 12G, in an embodiment of block 1112, the vendor mobile application on the mobile device 214 and the compute device 202 may perform communication operations 1212 that may include the vendor mobile application receiving the operations that user is permitted to perform with the compute device 202, which it may display to the user of the mobile device 214.

The method 1100 then proceeds to block 1114 where the vendor mobile application performs at least one management operation on the infrastructure device. In an embodiment, at block 1114, the user of the mobile device 214 may use the vendor mobile application to restart the authentication process for the compute device 202 (e.g., via its wireless module), set an authentication token for the compute device 202, and/or perform other management operations that would be apparent to one of skill in the art in possession of the present disclosure. In a specific example, the vendor mobile application on the mobile device 214 may be used to recover infrastructure devices in the case of failure of the authentication process described above with regard to the methods 700 or 900, and may also be utilized in situations where an infrastructure device is deployed in isolation. In a specific example, a user of the mobile device 214 may manually reset a vendor infrastructure device certificate and keys included on an infrastructure device by, for example, disabling the infrastructure device discovery functionality discussed above that allows for the discovery of neighboring infrastructure devices from the same vendor.

In some embodiments, the mobile device 214 may be utilized in response to a remote reset of an infrastructure device. As will be appreciated by one of skill in the art in possession of the present disclosure, following an initial vendor infrastructure device certificate exchange between the key management system 208 and an infrastructure device, the credential generation key will be available on that infrastructure device, and information identifying that infrastructure device will be available on the key management system 208. Furthermore, as discussed above, the key management system 208 and the authentication system 210 will synchronize the information identifying that infrastructure device after it is onboarded to the networked system 200. As such, in response to a remote reset of that infrastructure device, the network administrator or other user may use the authentication system 210 to configure user(s) and provide policy-based access for those users to configure that infrastructure device following the remote reset. In some embodiments, in the case of a factory reset of an infrastructure device, the device management subsystem in that infrastructure device may generate a notification that will reach the authentication system 210. Furthermore, following factory reset, the wireless module on that infrastructure device may be utilized as discussed above to establish a wireless link to the key management system 208, and send a notification to the authentication system 210, which allows subsequent re-onboarding/recovery of that factory-reset infrastructure device to its state prior to that factory reset.

Thus, systems and methods have been described that provide 1) a secure ecosystem that may utilize BMCs/management modules/networking OSs in infrastructure devices provided by the same vendor in order to allow for the onboarding of those infrastructure devices in a "lights-out" datacenter via an EKMS and OIDC, 2) a secure method to share keys and certificates of newly added infrastructure devices with existing infrastructure devices in a datacenter, and 3) a secure remote method to allow a network administrator to allocate temporal functional enablement for users of mobile devices to carry out infrastructure device management operations. As such, one of skill in the art in possession of the present disclosure will appreciate how the systems and methods of the present disclosure provide for unattended and secure onboarding and authentication for infrastructure devices in a datacenter that are provided by the same vendor, the use of wireless communications to avoid the need for wired authentication while performing secure authentication with physical/on-premises security, enhanced security with multi-device verification of new infrastructure devices by existing infrastructure devise (which may be selected randomly), and authentication token-based device access control delegation. Thus, a network administrator or other user is simply required to power on infrastructure devices to have those infrastructure devices onboard to the datacenter in a secure, autonomous manner, and may securely control any subsequent access to those devices in a user/profile-based manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure infrastructure onboarding system, comprising:
a first infrastructure device that includes a first infrastructure device wireless subsystem and that is configured to perform wireless key management system discovery operations using the first infrastructure device wireless subsystem in response to initialization;
a second infrastructure device that includes a second infrastructure device wireless subsystem and that is configured to perform wireless infrastructure device discovery operations using the second infrastructure device wireless subsystem in response to initialization; and
a key management system including a key management system wireless subsystem, wherein the key management system is configured to:
perform, using the key management system wireless subsystem, the wireless key management system discovery operations with the first infrastructure device;
wirelessly receive, from the first infrastructure device via the first infrastructure device wireless subsystem and through the key management system wireless subsystem, a first infrastructure device certificate along with a first infrastructure device validation key;
validate the first infrastructure device based on the first infrastructure device certificate and the first infrastructure device validation key; and
wirelessly transmit, in response to validating the first infrastructure device and through the key management system wireless subsystem to the first infrastructure device via the first infrastructure device wireless subsystem, a first credential generation key that is configured for use by the first infrastructure device to generate first authentication credentials, wherein the first infrastructure device is configured to:
perform, using the first infrastructure device wireless subsystem, the wireless infrastructure device discovery operations with the second infrastructure device;
wirelessly receive, from the second infrastructure device via the second infrastructure device wireless subsystem and through the first infrastructure device wireless subsystem, a second infrastructure device certificate along with a second infrastructure device validation key;
validate the second infrastructure device based on the second infrastructure device certificate and the second infrastructure device validation key; and
wirelessly transmit, in response to validating the second infrastructure device and through the first infrastructure device wireless subsystem to the second infrastructure device via the second infrastructure device wireless subsystem, a second credential generation key that is configured for use by the second infrastructure device to generate second authentication credentials.

2. The system of claim 1, wherein the first infrastructure device certificate includes a vendor certificate that was generated by a vendor system, and wherein the key management system is configured by the vendor system to validate the vendor certificate.

3. The system of claim 1, further comprising:
an authentication system that is coupled to the key management system, wherein the key management system is configured to:
communicate with the authentication system to map the first infrastructure device to the first credential generation key in the authentication system.

4. The system of claim 1, wherein the first infrastructure device is configured to:
generate, using the first credential generation key, the first authentication credentials; and
authenticate, using the first authentication credentials, to a networked system.

5. The system of claim 4, further comprising:
a mobile device,
wherein the first infrastructure device is configured to:
receive, from the mobile device, a first infrastructure device access token;
validate the first infrastructure device access token; and
transmit, to the mobile device in response to validating the first infrastructure device access token, the first infrastructure device certificate.

6. The system of claim 1, wherein the wireless infrastructure device discovery operations include:
performing, using relatively low frequency wireless communications, an initial handshake operation;
searching for the first infrastructure device or the second infrastructure device; and
establishing a wireless link with the first infrastructure device or the second infrastructure device.

7. The system of claim 6, wherein the first infrastructure device is configured to:
verify the second infrastructure device with the key management system.

8. The system of claim 7, further comprising:
an authentication system that is coupled to the key management system, wherein the key management system is configured to:
communicate with the authentication system to map the second infrastructure device to the second credential generation key in the authentication system.

9. The system of claim 6, wherein the first infrastructure device certificate and the second infrastructure device certificate each include a respective vendor certificate that was generated by a common vendor system.

10. An Information Handling System (IHS), comprising:
a key management key management processing system;
a key management memory system that is coupled to the key management processing system and that includes instructions that, when executed by the key management processing system, cause the key management processing system to provide a key management onboarding engine that is configured to:

perform, using a key management system wireless subsystem, wireless key management system discovery operations with first infrastructure device via a first infrastructure device wireless subsystem in the first infrastructure device;

wirelessly receive, from the first infrastructure device via the first infrastructure device wireless subsystem and through the key management system wireless subsystem, a first infrastructure device certificate along with a first infrastructure device validation key;

validate the first infrastructure device based on the first infrastructure device certificate and the first infrastructure device validation key; and wirelessly transmit, in response to validating the first infrastructure device and through the key management system wireless subsystem to the first infrastructure device via the first infrastructure device wireless subsystem, a first credential generation key that is configured for use by the first infrastructure device to generate first authentication credentials;

a first infrastructure device management processing system that is included in the first infrastructure device;

a first infrastructure device memory system that is included in the first infrastructure device and that is coupled to the first infrastructure device processing system and that includes instructions that, when executed by the first infrastructure device processing system, cause the first infrastructure device processing system to provide a first infrastructure device onboarding engine that is configured to:

perform, using a first infrastructure device wireless subsystem, the wireless infrastructure device discovery operations with a second infrastructure device via a second infrastructure device wireless subsystem in the second infrastructure device;

wirelessly receive, from the second infrastructure device via the second infrastructure device wireless subsystem and through the first infrastructure device wireless subsystem, a second infrastructure device certificate along with a second infrastructure device validation key;

validate the second infrastructure device based on the second infrastructure device certificate and the second infrastructure device validation key; and wirelessly transmit, in response to validating the second infrastructure device and through the first infrastructure device wireless subsystem to the second infrastructure device via the second infrastructure device wireless subsystem, a second credential generation key that is configured for use by the second infrastructure device to generate second authentication credentials.

11. The IHS of claim 8, wherein the first infrastructure device certificate includes a vendor certificate that was generated by a vendor system, and wherein the key management onboarding engine is configured by the vendor system to validate the vendor certificate.

12. The IHS of claim 8, wherein the key management onboarding engine is configured to:

communicate with an authentication system to map the first infrastructure device to the credential generation key in the authentication system.

13. A method for securely onboarding infrastructure devices in a networked system comprising:

performing, by a key management system using a key management system wireless subsystem, wireless key management system discovery operations with first infrastructure device via a first infrastructure device wireless subsystem in the first infrastructure device;

wirelessly receiving, by the key management system from the first infrastructure device via the first infrastructure device wireless subsystem and through the key management system wireless subsystem, a first infrastructure device certificate along with a first infrastructure device validation key;

validating, by the key management system, the first infrastructure device based on the first infrastructure device certificate and the first infrastructure device validation key;

wirelessly transmitting, by the key management system in response to validating the first infrastructure device and through the key management system wireless subsystem to the first infrastructure device via the first infrastructure device wireless subsystem, a first credential generation key that is configured for use by the first infrastructure device to generate first authentication credentials;

performing, by the first infrastructure device using the first infrastructure device wireless subsystem, wireless infrastructure device discovery operations with a second infrastructure device;

wirelessly receiving, by the first infrastructure device from the second infrastructure device via the second infrastructure device wireless subsystem and through the first infrastructure device wireless subsystem, a second infrastructure device certificate along with a second infrastructure device validation key;

validating, by the first infrastructure device, the second infrastructure device based on the second infrastructure device certificate and the second infrastructure device validation key; and wirelessly transmitting, by the first infrastructure device in response to validating the second infrastructure device and through the first infrastructure device wireless subsystem to the second infrastructure device via the second infrastructure device wireless subsystem, a second credential generation key that is configured for use by the second infrastructure device to generate second authentication credentials.

14. The method of claim 13, wherein the first infrastructure device certificate includes a vendor certificate that was generated by a vendor system, and wherein the key management onboarding engine is configured by the vendor system to validate the vendor certificate.

15. The method of claim 13, further comprising:

communicating, by the key management system, with an authentication system to map the first infrastructure device to the credential generation key in the authentication system.

16. The method of claim 13, further comprising:

generating, by the first infrastructure device using the first credential generation key, the first authentication credentials; and authenticating, by the first infrastructure device using the first authentication credentials, to a networked system.

17. The method of claim 16, further comprising:

receiving, by the first infrastructure device from a mobile device, a first infrastructure device access token;

validating, by the first infrastructure device, the first infrastructure device access token; and transmitting, by the first infrastructure device to the mobile device in response to validating the first infrastructure device access token, the first infrastructure device certificate.

18. The method of claim 16, wherein the wireless infrastructure device discovery operations include:
performing, using relatively low frequency wireless communications, an initial handshake operation;
searching for the first infrastructure device or the second infrastructure device; and
establishing a wireless link with the first infrastructure device or the second infrastructure device.

19. The method of claim 18, further comprising:
verifying, by the first infrastructure device, the second infrastructure device with the key management system.

20. The method of claim 18, wherein the first infrastructure device certificate and the second infrastructure device certificate each include a respective vendor certificate that was generated by a common vendor system.

* * * * *